(12) United States Patent
Shey et al.

(10) Patent No.: US 12,097,750 B2
(45) Date of Patent: Sep. 24, 2024

(54) HEAT PUMP FOR A VEHICLE

(71) Applicant: Ford Global Technologies, LLC, Dearborn, MI (US)

(72) Inventors: Rachael Shey, Clawson, MI (US); Jeffrey Paul Brown, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 17/510,724

(22) Filed: Oct. 26, 2021

(65) Prior Publication Data
US 2023/0126723 A1    Apr. 27, 2023

(51) Int. Cl.
*B60H 1/00*    (2006.01)
*F25B 30/02*    (2006.01)
(Continued)

(52) U.S. Cl.
CPC ..... *B60H 1/00899* (2013.01); *B60H 1/00485* (2013.01); *F25B 30/02* (2013.01); *F25B 41/20* (2021.01); *F25B 41/24* (2021.01); *F25B 41/39* (2021.01); *B60H 2001/00928* (2013.01); *B60H 2001/00957* (2013.01);
(Continued)

(58) Field of Classification Search
CPC ............. B60H 1/3213; B60H 1/00899; B60H 1/2225; B60H 2001/00307; B60H 2001/00928; B60H 2001/3252; B60H 1/00278; B60H 1/00735; B60H 2001/3285; B60H 2001/003; B60H 1/3223; B60H 1/32281; F25B 30/02; F25B 41/20; F25B 41/24; F25B 41/31; F25B 2600/2519; F25B 5/02; F25B 6/02; F25B 13/00; F25B 41/392313; F25B 2339/04; F25B 2400/13; F25B 2400/23; F25B 2600/2507
See application file for complete search history.

(56) References Cited

U.S. PATENT DOCUMENTS 4,751,823 A * 6/1988 Hans ................... F25B 41/20
   62/201
4,972,676 A * 11/1990 Sakai ................... F25B 13/00
   62/512
(Continued)

*Primary Examiner* — Ljiljana V. Ciric
(74) *Attorney, Agent, or Firm* — Vichi Chea; Price Heneveld LLP

(57) ABSTRACT

A heat pump includes a refrigerant loop. The refrigerant loop includes a first heat exchanger, a first region of a second heat exchanger, a third heat exchanger, a fourth heat exchanger, a compressor, a vapor generator, an accumulator, a first expansion valve, and a first three-way valve. The compressor includes a low-pressure inlet, a mid-pressure inlet, and an outlet. The vapor generator is positioned downstream of the outlet of the compressor and upstream of both the low-pressure inlet and the mid-pressure inlet. The vapor generator includes a first region and a second region. The accumulator is positioned immediately upstream of the compressor. The accumulator includes an inlet and an outlet. The first expansion valve is positioned upstream of the accumulator. The first expansion valve includes an inlet and an outlet. The first three-way valve is positioned immediately downstream of the first expansion valve and immediately upstream of the accumulator.

13 Claims, 20 Drawing Sheets

(51) Int. Cl.
  *F25B 41/20* (2021.01)
  *F25B 41/24* (2021.01)
  *F25B 41/31* (2021.01)
  *F25B 41/39* (2021.01)
(52) U.S. Cl.
  CPC .... *B60H 2001/00961* (2019.05); *F25B 41/31* (2021.01); *F25B 2300/00* (2013.01)

(56) References Cited

U.S. PATENT DOCUMENTS

| | | | |
|---|---|---|---|
| 5,186,012 A * | 2/1993 | Czachorski | C09K 5/041 |
| | | | 62/149 |
| 5,228,301 A * | 7/1993 | Sjoholm | B60H 1/00007 |
| | | | 62/84 |
| 5,400,609 A * | 3/1995 | Sjoholm | F25B 49/022 |
| | | | 62/200 |
| 5,408,836 A * | 4/1995 | Sjoholm | F25B 29/003 |
| | | | 62/84 |
| 5,410,889 A * | 5/1995 | Sjoholm | F25B 49/02 |
| | | | 62/196.2 |
| 5,732,564 A * | 3/1998 | Misawa | F25B 45/00 |
| | | | 62/503 |
| 6,920,922 B2 | 7/2005 | Takeuchi | |
| 9,612,041 B2 | 4/2017 | Kawakami et al. | |
| 9,786,964 B2 | 10/2017 | Takeuchi et al. | |
| 10,391,835 B2 | 8/2019 | Blatchley et al. | |
| 10,465,952 B2 * | 11/2019 | He | F25B 47/022 |
| 10,737,552 B2 * | 8/2020 | He | F25B 41/20 |
| 10,760,798 B2 * | 9/2020 | Blanton | F24F 11/63 |
| 11,421,918 B2 * | 8/2022 | Thatte | F25B 41/20 |
| 11,560,042 B2 * | 1/2023 | Brown | B60H 1/32284 |
| 11,906,213 B2 * | 2/2024 | Brown | F25B 5/04 |
| 11,912,105 B2 * | 2/2024 | Shey | B60H 1/32284 |
| 11,919,368 B2 * | 3/2024 | Shey | B60H 1/00921 |
| 11,920,834 B2 * | 3/2024 | Shey | F25B 25/005 |
| 11,927,372 B2 * | 3/2024 | Shey | F25B 5/04 |
| 11,987,098 B2 * | 5/2024 | Shey | F25B 41/39 |
| 12,000,639 B2 * | 6/2024 | Shey | F25B 5/02 |
| 12,017,509 B2 * | 6/2024 | Shey | B60H 1/32284 |
| 2002/0174673 A1 * | 11/2002 | Wilkinson | F25B 13/00 |
| | | | 62/260 |
| 2012/0017637 A1 | 1/2012 | Nakajo et al. | |
| 2020/0290429 A1 | 9/2020 | Blatchley et al. | |
| 2022/0412611 A1 * | 12/2022 | Brown | F25B 49/022 |
| 2023/0109595 A1 * | 4/2023 | Brown | F25B 41/24 |
| | | | 62/244 |
| 2023/0113540 A1 * | 4/2023 | Shey | F25B 41/42 |
| | | | 62/324.6 |
| 2023/0114381 A1 * | 4/2023 | Shey | B60H 1/00885 |
| | | | 62/324.1 |
| 2023/0126723 A1 * | 4/2023 | Shey | B60H 1/3223 |
| | | | 62/160 |
| 2023/0130167 A1 * | 4/2023 | Welch | F25B 41/20 |
| | | | 62/238.6 |
| 2023/0131019 A1 * | 4/2023 | Shey | F25B 5/02 |
| | | | 62/160 |
| 2023/0182535 A1 * | 6/2023 | Shey | B60H 1/00885 |
| | | | 62/160 |
| 2023/0194129 A1 * | 6/2023 | Shey | B60H 1/32284 |
| | | | 62/498 |
| 2023/0349597 A1 * | 11/2023 | Shey | B60H 1/00921 |
| 2023/0366591 A1 * | 11/2023 | Shey | F25B 41/20 |
| 2023/0366595 A1 * | 11/2023 | Shey | F25B 41/20 |
| 2024/0088417 A1 * | 3/2024 | Arya | H01M 8/04059 |
| 2024/0149641 A1 * | 5/2024 | Shey | B60H 1/00342 |
| 2024/0183584 A1 * | 6/2024 | Butler | F25B 13/00 |
| 2024/0183585 A1 * | 6/2024 | Raimbault | F25B 41/20 |
| 2024/0190210 A1 * | 6/2024 | Michikawauchi | B60H 1/00278 |
| 2024/0198755 A1 * | 6/2024 | Sakamoto | B60H 1/00278 |

* cited by examiner

HEAT PUMP FOR A VEHICLE

FIELD OF THE DISCLOSURE

The present disclosure generally relates to a heat pump. More specifically, the present disclosure relates to a heat pump for a vehicle.

BACKGROUND OF THE INVENTION

Heat pumps have been employed in vehicles. A refrigerant loop can be included in such heat pumps.

SUMMARY OF THE INVENTION

According to a first aspect of the present invention, a heat pump includes a refrigerant loop. The refrigerant loop includes a first heat exchanger, a first region of a second heat exchanger, a third heat exchanger, a fourth heat exchanger, a compressor, a vapor generator, an accumulator, a first expansion valve, and a first three-way valve. The compressor includes a low-pressure inlet, a mid-pressure inlet, and an outlet. The vapor generator is positioned downstream of the outlet of the compressor and upstream of both the low-pressure inlet and the mid-pressure inlet. The vapor generator includes a first region and a second region that thermally interact with one another. The accumulator is positioned immediately upstream of the compressor. The accumulator includes an inlet and an outlet. The first expansion valve is positioned upstream of the accumulator. The first expansion valve includes an inlet and an outlet. The first three-way valve is positioned immediately downstream of the first expansion valve and immediately upstream of the accumulator. The first three-way valve directs a first heat exchange fluid from the outlet of the first expansion valve to the inlet of the accumulator during at least one mode of operation.

Embodiments of the first aspect of the invention can include any one or a combination of the following features:
- the vapor generator is a plate-style heat exchanger;
- the at least one mode of operation is a deicing mode of operation;
- the refrigerant loop further includes a first check valve positioned immediately downstream of the third heat exchanger and a second check valve positioned immediately downstream of the fourth heat exchanger;
- the refrigerant loop further includes a second three-way valve positioned downstream of the outlet of the compressor and upstream of an inlet of the first heat exchanger, wherein the second three-way valve is positioned upstream of the first region of the second heat exchanger;
- the refrigerant loop further includes a second expansion valve positioned upstream of the first region of the vapor generator;
- the refrigerant loop further includes a third expansion valve positioned upstream of the third heat exchanger;
- the refrigerant loop further includes a fourth expansion valve positioned upstream of the fourth heat exchanger;
- the refrigerant loop further includes a first shutoff valve plumbed in series with the first heat exchanger, wherein the first shutoff valve is positioned downstream of the first heat exchanger;
- the refrigerant loop further includes a second shutoff valve plumbed in series with the second region of the vapor generator, wherein the second shutoff valve is positioned downstream of the second region of the vapor generator;
- the refrigerant loop further includes a third shutoff valve plumbed in series with the first heat exchanger, wherein the third shutoff valve is downstream of the first heat exchanger, and wherein the third shutoff valve is upstream of the accumulator;
- the refrigerant loop further includes a fourth shutoff valve plumbed in series with the first heat exchanger, wherein the fourth shutoff valve is downstream of the first heat exchanger, and wherein the fourth shutoff valve is in an open position during the at least one mode of operation; and
- a coolant loop that includes a second region of the second heat exchanger, a pump, a fifth heat exchanger, a reservoir, and a coolant network of conduits that fluidly couples components of the coolant loop.

According to a second aspect of the present disclosure, a heat pump includes a refrigerant loop. The refrigerant loop includes a first heat exchanger, a first region of a second heat exchanger, a third heat exchanger, a fourth heat exchanger, a compressor, a vapor generator, an accumulator, a first expansion valve, a second expansion valve, a third expansion valve, a fourth expansion valve, a first three-way valve, a first check valve, and a second check valve. The compressor includes a low-pressure inlet, a mid-pressure inlet, and an outlet. The vapor generator is positioned downstream of the outlet of the compressor and upstream of both the low-pressure inlet and the mid-pressure inlet. The vapor generator includes a first region and a second region that thermally interact with one another. The accumulator is positioned immediately upstream of the compressor. The accumulator includes an inlet and an outlet. The first expansion valve is positioned upstream of the accumulator. The first expansion valve includes an inlet and an outlet. The second expansion valve is positioned upstream of the first region of the vapor generator. The third expansion valve is positioned upstream of the third heat exchanger. The fourth expansion valve is positioned upstream of the fourth heat exchanger. The first three-way valve is positioned immediately downstream of the first expansion valve and immediately upstream of the accumulator. The first three-way valve directs a first heat exchange fluid from the outlet of the first expansion valve to the inlet of the accumulator during at least one mode of operation. The first check valve is positioned immediately downstream of the third heat exchanger. The second check valve is positioned immediately downstream of the fourth heat exchanger.

Embodiments of the second aspect of the present disclosure can include any one or a combination of the following features:
- the refrigerant loop further includes a second three-way valve positioned downstream of the outlet of the compressor and upstream of an inlet of the first heat exchanger, wherein the first three-way valve is positioned upstream of the first region of the second heat exchanger;
- the refrigerant loop further includes a first shutoff valve plumbed in series with the first heat exchanger, wherein the first shutoff valve is positioned downstream of the first heat exchanger;
- the refrigerant loop further includes a second shutoff valve plumbed in series with the second region of the vapor generator, wherein the second shutoff valve is positioned downstream of the second region of the vapor generator;

the refrigerant loop further includes a third shutoff valve plumbed in series with the first heat exchanger, wherein the third shutoff valve is downstream of the first heat exchanger, and wherein the third shutoff valve is upstream of the accumulator;

the refrigerant loop further includes a fourth shutoff valve plumbed in series with the first heat exchanger, wherein the fourth shutoff valve is downstream of the first heat exchanger, and wherein the fourth shutoff valve is in an open position during the at least one mode of operation; and a coolant loop includes a second region of the second heat exchanger, a pump, a fifth heat exchanger, a reservoir, and a coolant network of conduits that fluidly couples components of the coolant loop.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
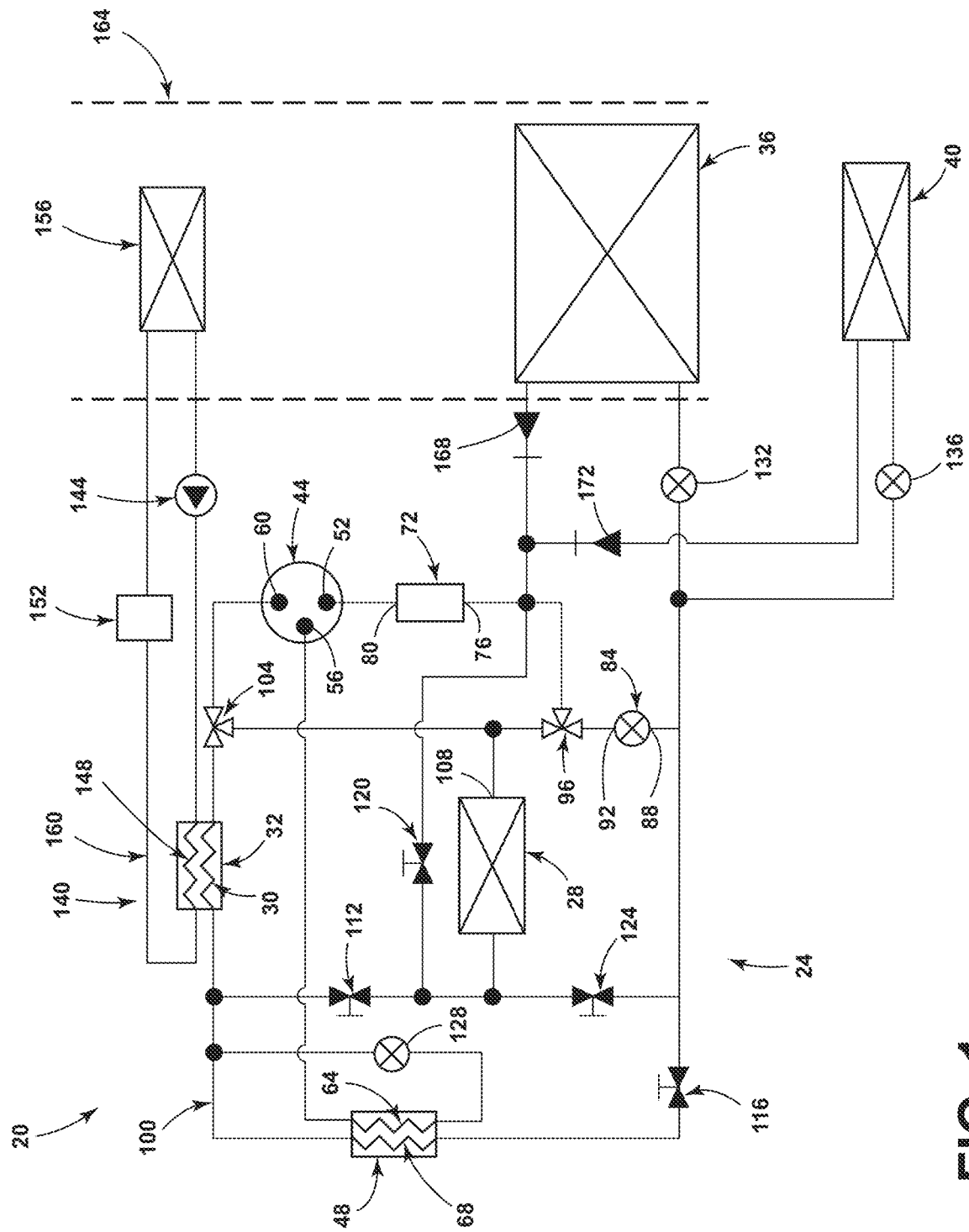
FIG. 1 is a schematic representation of a heat pump arrangement, illustrating a refrigerant loop and a coolant loop, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-19, reference numeral 20 generally designates a heat pump. The heat pump 20 includes a refrigerant loop 24. The refrigerant loop 24 includes a first heat exchanger 28, a first region 30 of a second heat exchanger 32, a third heat exchanger 36, a fourth heat exchanger 40, a compressor 44, and a vapor generator 48. The compressor 44 includes a low-pressure inlet 52, a mid-pressure inlet 56, and an outlet 60. The vapor generator is positioned downstream of the outlet 60 of the compressor 44 and upstream of both the low-pressure inlet 52 and the mid-pressure inlet 56. In some examples, the vapor generator 48 can include a first region 64 and a second region 68 that thermally interact with one another, as will be discussed in further detail herein. In various examples, the vapor generator 48 can remove at least a portion of a gaseous component of a first heat exchange fluid and provide the at least a portion of the gaseous component of the first heat exchange fluid to the mid-pressure inlet 56 of the compressor 44. The refrigerant loop 24 also includes an accumulator 72 that is positioned immediately upstream of the compressor 44. The accumulator 72 includes an inlet 76 and an outlet 80. A first expansion valve 84 is positioned upstream of the accumulator 72. The first expansion valve 84 includes an inlet 88 and an outlet 92. A first three-way valve 96 is positioned immediately downstream of the first expansion valve 84 and immediately upstream of the accumulator 72. The first three-way valve 96 directs the first heat exchange fluid from the outlet 92 of the first expansion valve 84 to the inlet 88 of the accumulator 72 during at least one mode of operation, as will be discussed in further detail herein. In some examples, the at least one mode of operation may be a deicing mode of operation. The various components of the refrigerant loop 24 are fluidly coupled to one another by way of a refrigerant network of conduits 100. For the sake of brevity and clarity, individual sections of the refrigerant network of conduits 100 will not be discussed unless additional clarity is provided by such discussion. Rather, the flow of the first heat exchange fluid will be described with regard to the interaction between the first heat exchange fluid and the various components of the refrigerant loop 24.

Referring again to FIGS. 1-19, a second three-way valve 104 is positioned downstream of the outlet 60 of the compressor 44 and upstream of an inlet 108 of the first heat exchanger 28, Additionally, the second three-way valve 104 is positioned upstream of the first region 30 of the second heat exchanger 32. In various examples, the accumulator 72 is positioned immediately upstream of the low-pressure inlet 52 of the compressor 44. The accumulator 72 may be a suction accumulator. In general, the accumulator 72 can protect the compressor 44 from liquid slugging or liquid being introduced into the compressor 44. The accumulator 72 can also retain moisture and contaminants from the refrigerant loop 24 and ensure that only refrigerant, such as the first heat exchange fluid, is returning to the compressor 44. It is contemplated that a receiver-dryer may be used in place of the accumulator 72 or in addition to the accumulator 72. In examples that employ the receiver-dryer, the receiver-dryer can be positioned along the refrigerant loop 24 (e.g., along the refrigerant network of conduits 100). When employed, the receiver-dryer can act as a temporary storage container for the first heat exchange fluid during low system demands when operating the heat pump 20. Additionally, the receiver-dryer can contain a desiccant that is used to absorb moisture (e.g., water) that may have entered the first heat exchange fluid. In some examples, the receiver-dryer may include a filter that can trap debris that may have entered into the refrigerant loop 24 and/or the first heat exchange fluid.

Referring yet again to FIGS. 1-19, a first shutoff valve 112 is plumbed in series with the first heat exchanger 28 and is positioned downstream of the first heat exchanger 28. A second shutoff valve 116 is plumbed in series with the second region 68 of the vapor generator 48. The second shutoff valve 116 is positioned downstream of the second region 68. A third shutoff valve 120 is plumbed in series with the first heat exchanger 28 and is positioned downstream of the first heat exchanger 28. The third shutoff valve 120 is positioned upstream of the accumulator 72, For example, the third shutoff valve 120 may be positioned immediately upstream of the accumulator 72. A fourth shutoff valve 124 is plumbed in series with the first heat exchanger 28. The fourth shutoff valve 124 is downstream of the first heat exchanger 28. The fourth shutoff valve 124 is in an open position during the at least one mode of operation where the first three-way valve 96 directs the first heat exchange fluid from the outlet 92 of the first expansion valve 84 to the inlet 88 of the accumulator 72.

Referring further to FIGS. 1-19, a second expansion valve 128 is positioned upstream of the vapor generator 48. In some examples, the vapor generator 48 is a liquid-gas separator valve. In such examples, the liquid-gas separator valve may perform a thermal phase separation and/or a mechanical phase separation, whereby a gaseous component of the first heat exchange fluid that is circulating through the refrigerant loop 24 is extracted, at least in part. The portion of the gaseous component of the first heat exchange fluid extracted by the liquid-gas separator valve may then be injected into the compressor at the mid-pressure inlet 56. Additionally, in such examples, the remainder of the first heat exchange fluid, which may contain liquid and gas components, is circulated through the refrigerant network of conduits 100 to remaining components of the refrigerant loop 24 for a given mode of operation. This remaining portion of the first heat exchange fluid eventually is directed to the low-pressure inlet 52 of the compressor 44. In alternative examples, the vapor generator 48 is a plate-style heat exchanger. In such examples, the second expansion valve 128 can be positioned upstream of the first region 64 of the vapor generator 48. For example, the second expansion valve 128 can be positioned immediately upstream of the first region 64 of the vapor generator 48. A third expansion valve 132 is positioned upstream of the third heat exchanger 36. A fourth expansion valve 136 is positioned upstream of the fourth heat exchanger 40.

Referring still further to FIGS. 1-19, the heat pump 20 can further include a coolant loop 140. The coolant loop 140 includes a pump 144, a second region 148 of the second heat exchanger 32, a reservoir 152, a fifth heat exchanger 156, and a coolant network of conduits 160 that fluidly couples components of the coolant loop 140. A second heat exchange fluid flows through the coolant network of conduits 160 of the coolant loop 140, as well as the components of the coolant loop 140. The first and second heat exchange fluids thermally interact by way of the second heat exchanger 32. More specifically, as the first and second heat exchange fluids flow through the first region 30 and the second region 148 of the second heat exchanger 32, respectively, the first and second heat exchange fluids thermally interact. In various examples, the fifth heat exchanger 156 can be in fluid communication with ductwork 164 of a Heating, Ventilation, and Air Conditioning (HVAC) system. Similarly, the third heat exchanger 36 can be in fluid communication with the ductwork 164 of the HVAC system. Accordingly, the third and fifth heat exchangers 36, 176 may be employed to alter a temperature of ambient air and provide temperature-controlled air to an environment (e.g., a cabin of a vehicle). A first check valve 168 is positioned immediately downstream of the third heat exchanger 36. A second check valve 172 is positioned immediately downstream of the fourth heat exchanger 40.

Referring now to FIGS. 2A-11, various modes of operation that employ the vapor generator 48 are depicted in exemplary form. The specifics of the particular modes of operation will be discussed in further detail herein. In the examples where the vapor generator 48 includes the first region 64 and the second region 68 (e.g., a plate-style heat exchanger), a first branching point 176 is positioned immediately upstream of an inlet 180 of the second region 68 of the vapor generator 48. Similarly, the first branching point 176 is positioned immediately upstream of the second expansion valve 128. The first heat exchange fluid is driven through the refrigerant network of conduits 100 by the compressor 44 along a variety of paths to reach the first branching point 176 based upon the given mode of operation, as will be discussed in further detail herein. Once the first heat exchange fluid reaches the first branching point 176, a portion of the first heat exchange fluid is diverted toward the second expansion valve 128, while the remaining portion of the first heat exchange fluid continues toward the second region 68 of the vapor generator 48. In various examples, the portion of the first heat exchange fluid that is diverted toward the second expansion valve 128 can be expressed as a ratio or percentage. For example, expressing the ratio as a percentage of the first heat exchange fluid that is diverted toward the second expansion valve 128, the second expansion valve 128 can receive about 5%, about 10%, about 15%, about 20%, about 25%, about 30%, about 35%, about 40%, about 45%, about 50%, about 55%, or about 60% of the first heat exchange fluid that encounters the first branching point 176. The remainder, or balancing percentage, of the first heat exchange fluid that encounters the first branching point 176 and is not diverted toward the second expansion valve 128 can continue toward the second region 68 of the vapor generator 48. It is contemplated that in different modes of operation of the heat pump 20, the percentage of the first heat exchange fluid that is received by the second expansion valve 128 may vary. The portion of the first heat exchange fluid that is diverted toward the second expansion valve 128 flows through the second expansion valve 128 and is directed toward an inlet 184 of the first region 64 of the vapor generator 48. This diverted portion of the first heat exchange fluid flows through the first region 64 and exits the vapor generator 48 at an outlet 188 of the vapor generator 48. The portion of the first heat exchange fluid that was diverted toward the second expansion valve 128 decreases in pressure and temperature as a result of interaction with the second expansion valve 128. Accordingly, the first heat exchange fluid flowing through the first region 64 of the vapor generator 48 has a lower pressure and temperature than the first heat exchange fluid flowing through the second region 68. Therefore, the first heat exchange fluid within the first region 64 thermally interacts with the first heat exchange fluid flowing through the second region 68 of the vapor generator 48.

Referring again to FIGS. 2A-11, as a result of the thermal interaction between the first heat exchange fluid within the first region 64 and the first heat exchange fluid within the second region 68, the first heat exchange fluid within the first region 64 exits the vapor generator 48 at the outlet 188 of the first region 64 at a higher temperature, pressure, and/or vapor percentage than the first heat exchange fluid that entered the inlet 184 of the first region 64. The first heat exchange fluid that exits the first region 64 by way of the outlet 188 is directed toward the mid-pressure inlet 56 of the compressor 44. The first heat exchange fluid from the first region 64 of the vapor generator 48 is injected into the compressor 44. The injection of the first heat exchange fluid at the mid-pressure inlet 56 of the compressor 44 can improve efficiency of the refrigerant loop 24 and/or increase a heat exchange capacity of the refrigerant loop 24. For example, the injection the first heat exchange fluid at the mid-pressure inlet 56 of the compressor 44 can increase a condensing capacity of the refrigerant loop 24 while decreasing a load experienced by the compressor 44. The improved condensing capacity of the refrigerant loop 24 and the decreased load on the compressor 44 can contribute to performance and efficiency improvements for the heat pump 20 and/or the refrigerant loop 24. Additionally, the injection of the first heat exchange fluid at the mid-pressure inlet 56 can increase an ambient temperature operating range of the heat pump 20 and/or the refrigerant loop 24.

Referring further to FIGS. 2A-11, the portion of the first heat exchange fluid that was not diverted toward the second expansion valve 128 and instead flowed toward the inlet 180 of the second region 68 of the vapor generator 48 thermally interacts with the first heat exchange fluid that was diverted toward the second expansion valve 128. During this thermal interaction between the first heat exchange fluid within the second region 68 and the first exchange fluid within the first region 64, heat is transferred from the first heat exchange fluid within the second region 68 to the first heat exchange fluid within the first region 64. Accordingly, the first heat exchange fluid exiting the vapor generator 48 at an outlet 192 of the second region 68 may be at a different temperature, pressure, and/or vapor percentage than the first heat exchange fluid that entered the inlet 180. For example, the first heat exchange fluid that exits the vapor generator 48 at the outlet 192 of the second region 68 may have a lower temperature and pressure than when the first heat exchange fluid entered the inlet 180 of the second region 68. Upon exiting the outlet 192 of the second region 68, the first heat exchange fluid is directed toward the second shutoff valve 116. The first heat exchange fluid flows through the second shutoff valve 116 as a result of the second shutoff valve 116 being in an open position.

Referring still further to FIGS. 2A-11, in examples where the vapor generator 48 includes the first and second regions 64, 68, a first coupling point 196 is positioned immediately upstream of the first branching point 176. In examples where the vapor generator 48 removes at least a portion of a gaseous component of the first heat exchange fluid and provides the at least a portion of the gaseous component of the first heat exchange fluid to the mid-pressure inlet 56 of the compressor 44, the first coupling point 196 is positioned immediately upstream of the second expansion valve 128, as will be discussed in further detail herein. In such examples, after passing through the first coupling point 196, the first heat exchange fluid flows through the second expansion valve 128 and is directed toward an inlet 200 (FIG. 29) of the vapor generator 48. As stated above, within the vapor generator 48 of such examples, at least a portion of the gaseous component of the first heat exchange fluid is separated or removed and directed toward the mid-pressure inlet 56 of the compressor 44. More specifically, the portion of the gaseous component that is separated from the first heat exchange fluid exits the vapor generator 48 by way of a first outlet 204 (FIG. 2B). A remainder of the first heat exchange fluid that did not exit the vapor generator 48 by way of the first outlet 204 is directed toward a second outlet 208 (FIG. 2B) of the vapor generator 48.

Referring yet again to FIGS. 2A-11, similar to the above discussion with regard to examples of the vapor generator 48 that include the first and second regions 64, 68, in various examples, the gaseous portion of the first heat exchange fluid that is directed toward the first outlet 204 by the vapor generator 48 can be expressed as a ratio or percentage. For example, expressing the ratio as a percentage of the first heat exchange fluid that is diverted toward the first outlet 204, the first outlet 204 can receive about 5%, about 10%, about 15%, about 20%, about 25%, about 30%, about 35%, about 40%, about 45%, about 50%, about 55%, or about 60% of the first heat exchange fluid that enters the vapor generator 48. The remainder, or balancing percentage, of the first heat exchange fluid that encounters the vapor generator 48 and is not diverted toward the first outlet 204 can be directed toward the second outlet 208 of the vapor generator 48. It is contemplated that in different modes of operation of the heat pump 20, the percentage of the first heat exchange fluid that is directed toward the first outlet 204 may vary. Additionally, it is contemplated that up to 100% of the gaseous component of the first heat exchange fluid may be separated and directed toward the first outlet 204. Upon exiting the second outlet 208 of the vapor generator 48, the first heat exchange fluid is directed toward the second shutoff valve 116. The first heat exchange fluid flows through the second shutoff valve 116 as a result of the second shutoff valve 116 being in an open position.

Referring to FIGS. 2A-4, a cabin cooling mode of operation (FIGS. 2A and 2B), a battery cooling mode of operation (FIG. 3), and a cabin and battery cooling mode of operation are each depicted in exemplary form. In each of these modes of operation, the compressor 44 acts upon the first heat exchange fluid to drive the first heat exchange fluid from the outlet 60 toward the second three-way valve 104. More specifically, the compressor 44 drives the first heat exchange fluid toward a first port 212 of the second three-way valve 104. As a result of the positioning of the second three-way valve 104 in these modes of operation, the first heat exchange fluid that is received at the first port 212 is directed to exit the second three-way valve 104 at a second port 216 thereof. After exiting the second port 216 of the second three-way valve 104, the first heat exchange fluid is directed toward the inlet 180 of the first heat exchanger 28. As the first heat exchange fluid flows through the first heat exchanger 28, the first heat exchange fluid may thermally interact with a heat exchange fluid that is external to the refrigerant loop 24 and the coolant loop 140 (e.g., ambient air) such that heat may be removed from the first heat exchange fluid. The first heat exchange fluid exits the first heat exchanger 28 at an outlet 220 of the first heat exchanger 28.

Referring again to FIGS. 2A-4, upon exiting the first heat exchanger 28 by way of the outlet 220, the first heat exchange fluid is directed toward the first shutoff valve 112. In each of these modes of operation, the first shutoff valve 112 is in an open position. After flowing through the first shutoff valve 112, the first heat exchange fluid passes through the first coupling point 196. The first coupling point 196 is downstream of the first region 30 of the second heat exchanger 32. The first coupling point 196 is upstream of the first branching point 176 and/or upstream of the second expansion valve 128 (see FIG. 2A). In some examples, from the first coupling point 196, the first heat exchange fluid is directed to the first branching point 176. In such examples, at the first branching point 176, the first heat exchange fluid is diverted in the manner already described with regard to the second expansion valve 128 and the first region 64 of the vapor generator 48. In various examples, from the first coupling point 196, the first heat exchange fluid is entirely directed to the second expansion valve 128 (see FIG. 2B). In such examples, after the entirety of the first heat exchange fluid that interacts with the first coupling point 196 passes through the second expansion valve 128, the first heat exchange fluid is directed toward the inlet 200 of the vapor generator 48. The first heat exchange fluid decreases in pressure and temperature as a result of interaction with the second expansion valve 128.

Figure 2A:
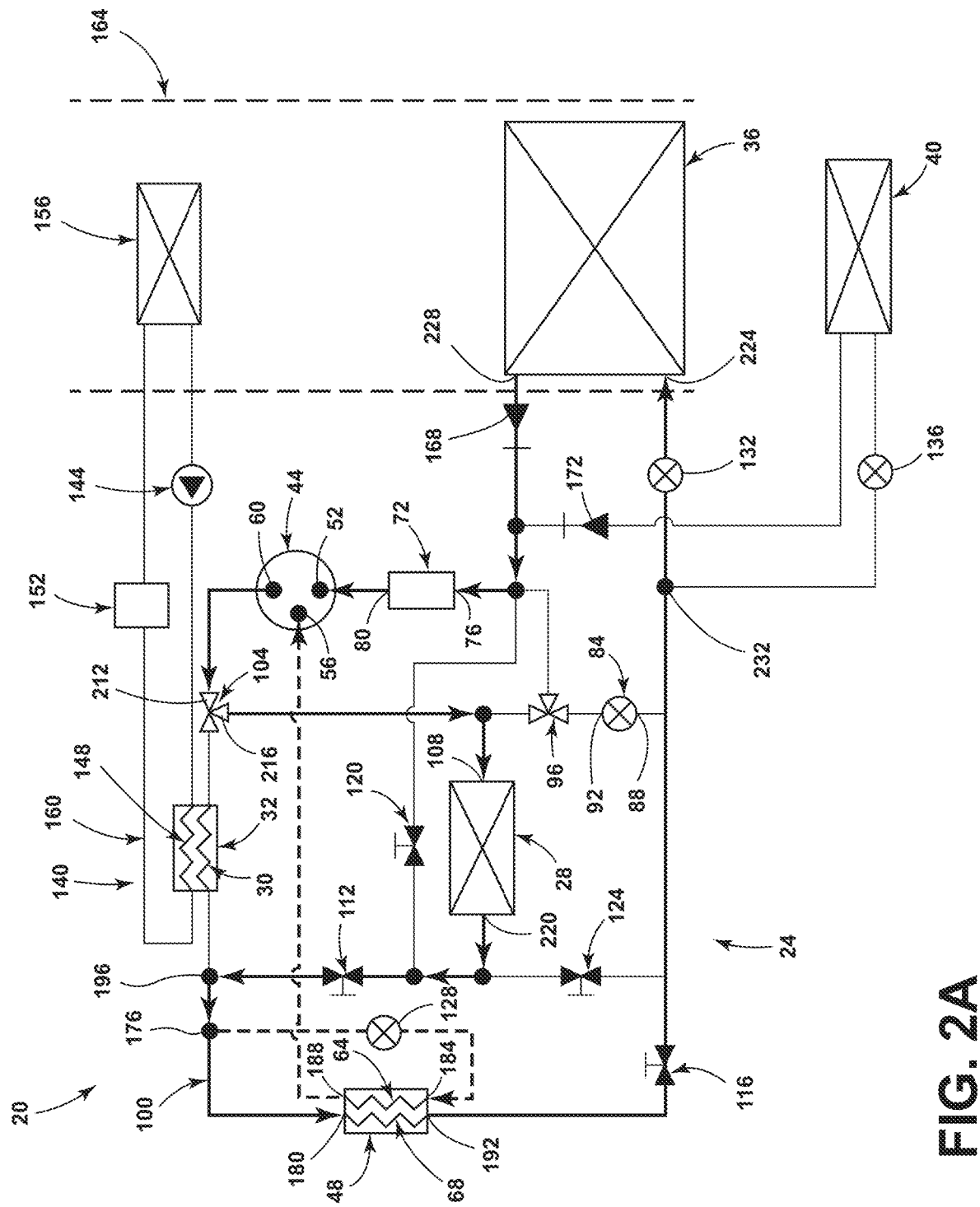
FIG. 2A is a schematic representation of the heat pump arrangement, illustrating a cabin cooling mode of operation, according to one example.
Figure 2B:
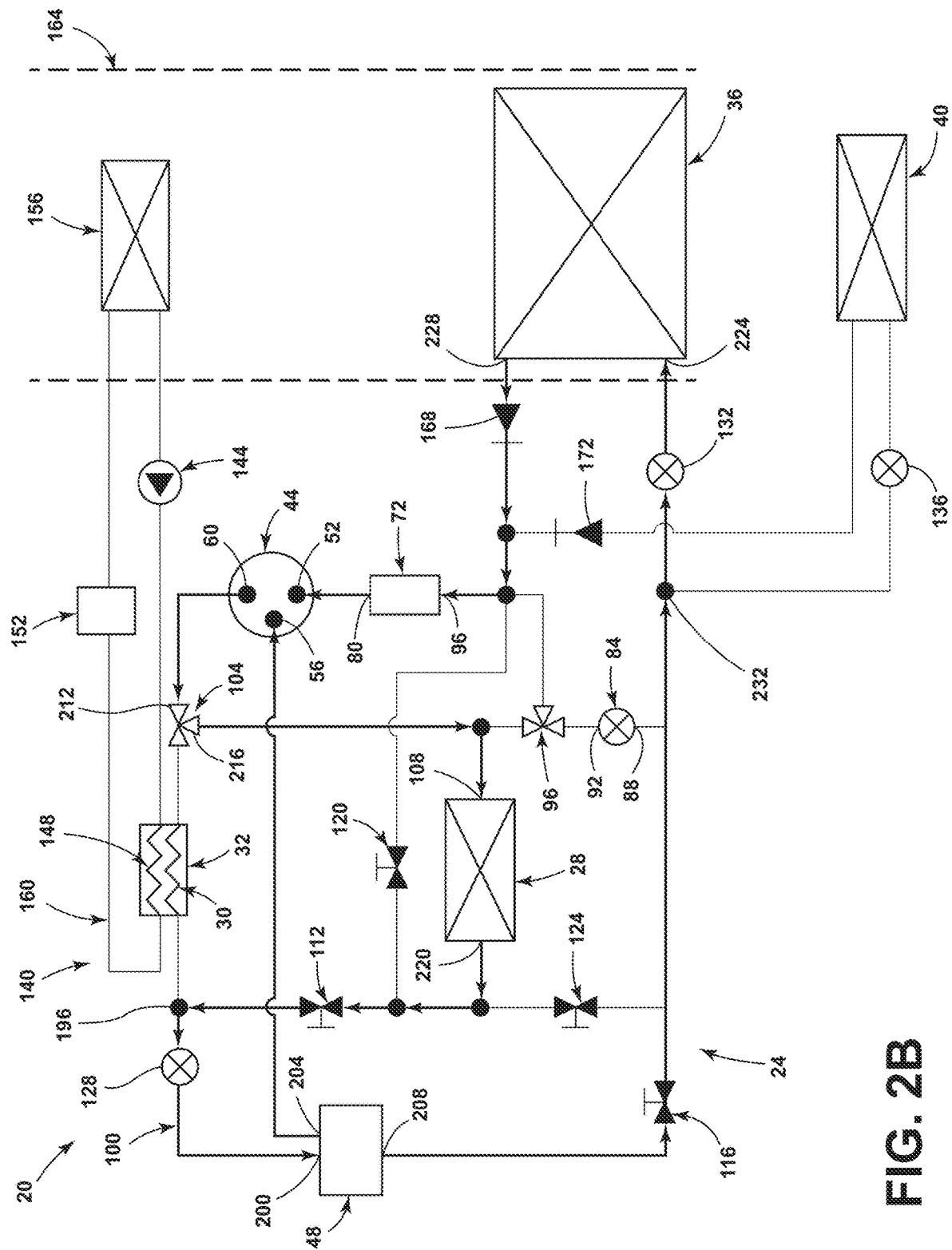
FIG. 2B is a schematic representation of the heat pump arrangement, illustrating the cabin cooling mode of operation, according to another example.

With specific reference to FIGS. 2A and 2B, as the flow of the first heat exchange fluid from the compressor 44 to the second shutoff valve 116 has been described above, such description here is omitted for brevity. The third shutoff valve 120 and the fourth shutoff valve 124 are closed in these modes of operation. Similarly, the first three-way valve 96 is placed in a position such that the first heat exchange fluid does not flow through the first-three way valve 96. In some examples, the first expansion valve 84 may be operated as a shutoff valve to prevent flow of the first heat exchange fluid to the first three-way valve 96. In the depicted examples, the fourth expansion valve 136 can operate as a shutoff valve such that the first heat exchange fluid does not pass through the fourth expansion valve 136. Accordingly, from the second shutoff valve 116, the first heat exchange fluid is directed toward the third expansion valve 132 by the refrigerant network of conduits 100. As with the second expansion valve 128, the first heat exchange fluid experiences a decrease in pressure and temperature as a result of interaction with the third expansion valve 132. After exiting the third expansion valve 132, the first heat exchange fluid is directed toward an inlet 224 of the third heat exchanger 36. The decreased temperature and pressure of the first heat exchange fluid flowing through the third heat exchanger 36 can be employed to provide cooling to air that is flowing through the ductwork 164 with which the third heat exchanger 36 is in fluid communication. Accordingly, the first heat exchange fluid that exits the third heat exchanger 36 by way of an outlet 228 of the third heat exchanger 36 may have an increased pressure, temperature, and or vapor percentage than the first heat exchange fluid that entered the third heat exchanger 36 at the inlet 224. Upon exiting the third heat exchanger 36 by way of the outlet 228, the first heat exchange fluid flows through the first check valve 168. After exiting the first check valve 168, the first heat exchange fluid is directed toward the accumulator 72 by the refrigerant network of conduits 100. The second check valve 172 prevents backflow toward the fourth heat exchanger 40 in these modes of operation. Accordingly, the fourth heat exchanger 40 is prevented from becoming a storage vessel for the first heat exchange fluid when the fourth heat exchanger 40 is not employed in a given mode of operation. The accumulator 72 receives the first heat exchange fluid and provides a gaseous component of the first heat exchange fluid to the low-pressure inlet 52 of the compressor 44, thereby completing the traversal of the refrigerant loop 24 in the cabin cooling mode of operation.

Figure 3:
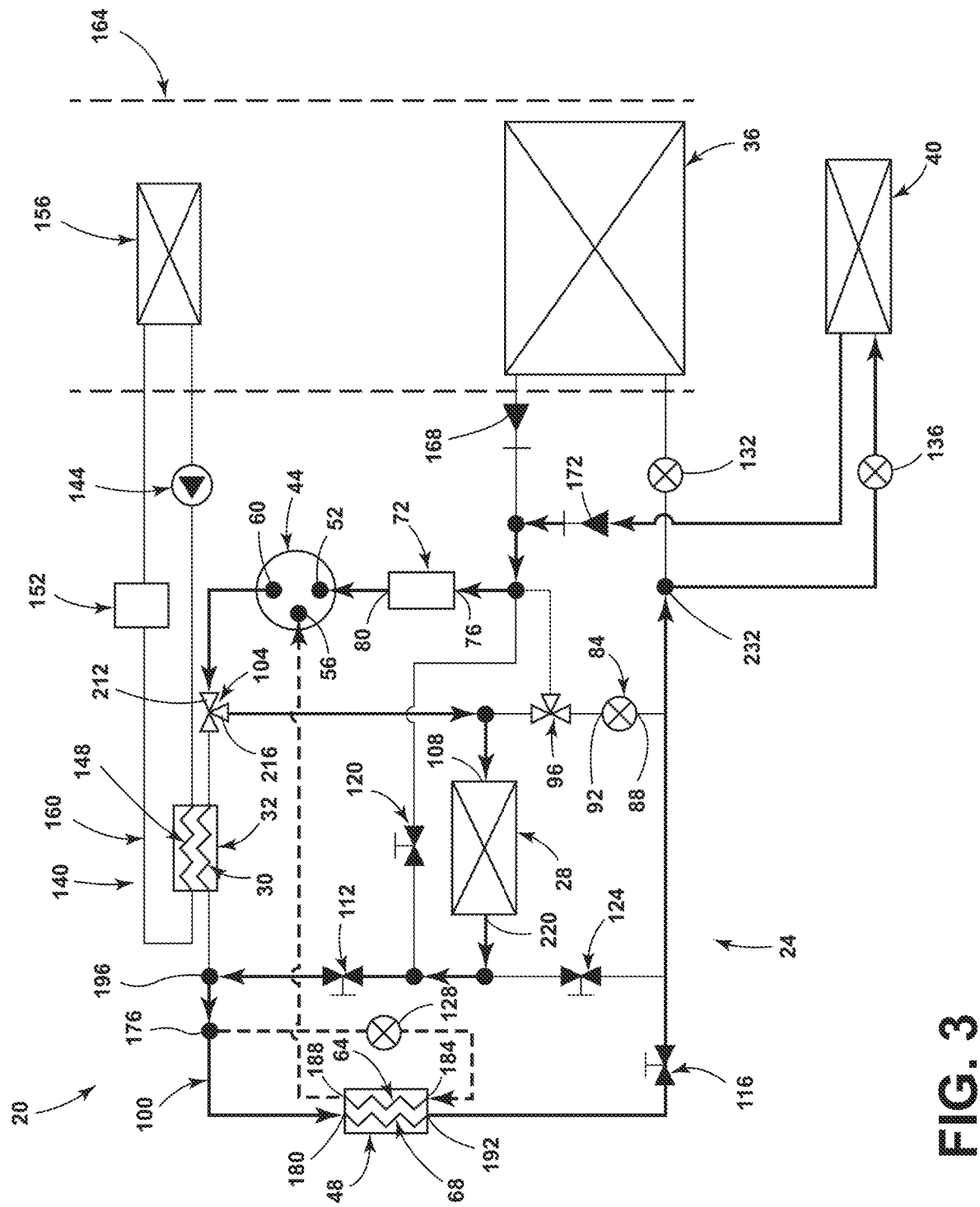
FIG. 3 is a schematic representation of the heat pump arrangement, illustrating a battery cooling mode of operation, according to one example.

Referring particularly to FIG. 3, as the flow of the first heat exchange fluid from the compressor 44 to the second shutoff valve 116 has been described above, such description is omitted here for brevity. The third shutoff valve 120 and the fourth shutoff valve 124 are closed in this mode of operation. Similarly, the first three-way valve 96 is placed in a position such that the first heat exchange fluid does not flow through the first-three way valve 96. In some examples, the first expansion valve 84 may be operated as a shutoff valve to prevent flow of the first heat exchange fluid to the first three-way valve 96. In the depicted example, the third expansion valve 132 can operate as a shutoff valve such that the first heat exchange fluid does not pass through the third expansion valve 132. Accordingly, from the second shutoff valve 116, the first heat exchange fluid is directed toward the fourth expansion valve 136. More specifically, the first heat exchange fluid encounters a second branching point 232 where, as a result of the third expansion valve 132 operating as a shutoff valve, the first heat exchange fluid is diverted toward the fourth expansion valve 136. In the example depicted in FIG. 2B, the second branching point 232 may be referred to as a first branching point or as a branching point. Regardless of the number of branching points, the first heat exchange fluid experiences a decrease in pressure and temperature as a result of interaction with the fourth expansion valve 136. After exiting the fourth expansion valve 136, the first heat exchange fluid is directed toward an inlet 236 of the fourth heat exchanger 40. The decreased temperature and pressure of the first heat exchange fluid flowing through the fourth heat exchanger 40 as a result of interaction with the fourth expansion valve 136 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of an outlet 240 of the fourth heat exchanger 40 may have an increased pressure, temperature, and/or vapor percentage than the first heat exchange fluid that entered the fourth heat exchanger 40 at the inlet 236. Upon exiting the fourth heat exchanger 40 by way of the outlet 240, the first heat exchange fluid is directed toward the second check valve 172 by the refrigerant network of conduits 100. Once the first heat exchange fluid passes through the second check valve 172, the first heat exchange fluid is directed toward the accumulator 72. The first check valve 168 prevents back flow toward the third heat exchanger 36 in this mode of operation. Accordingly, the third heat exchanger 36 is prevented from becoming a storage vessel for the first heat exchange fluid when the third heat exchanger 36 is not employed in a given mode of operation. The accumulator 72 receives the first heat exchange fluid and provides a gaseous component of the first heat exchange fluid to the low-pressure inlet 52 of the compressor 44, thereby completing the traversal of the refrigerant loop 24 in the battery cooling mode of operation.

Figure 4:
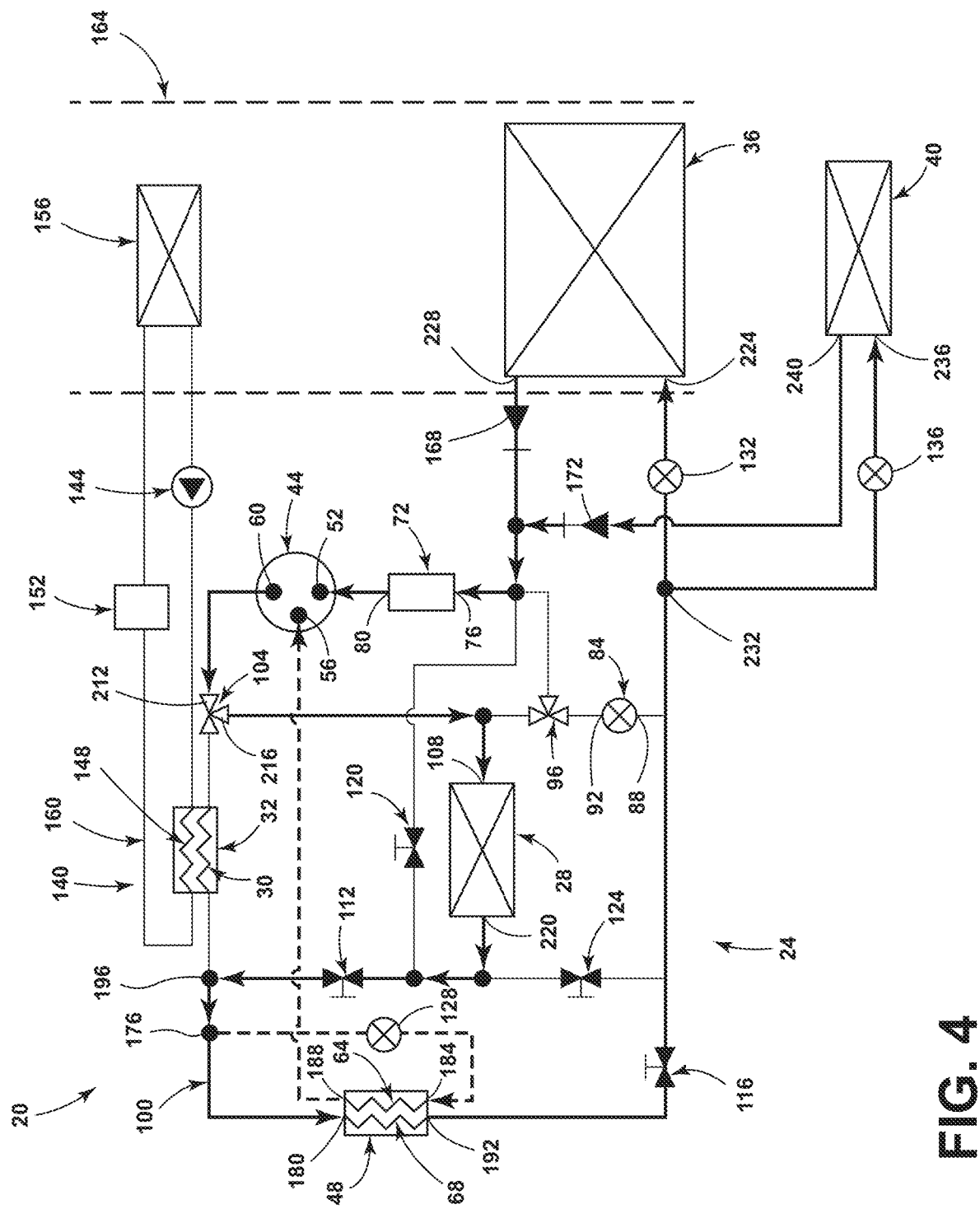
FIG. 4 is a schematic representation of the heat pump arrangement, illustrating a cabin and battery cooling mode of operation, according to one example.
Figure 5:
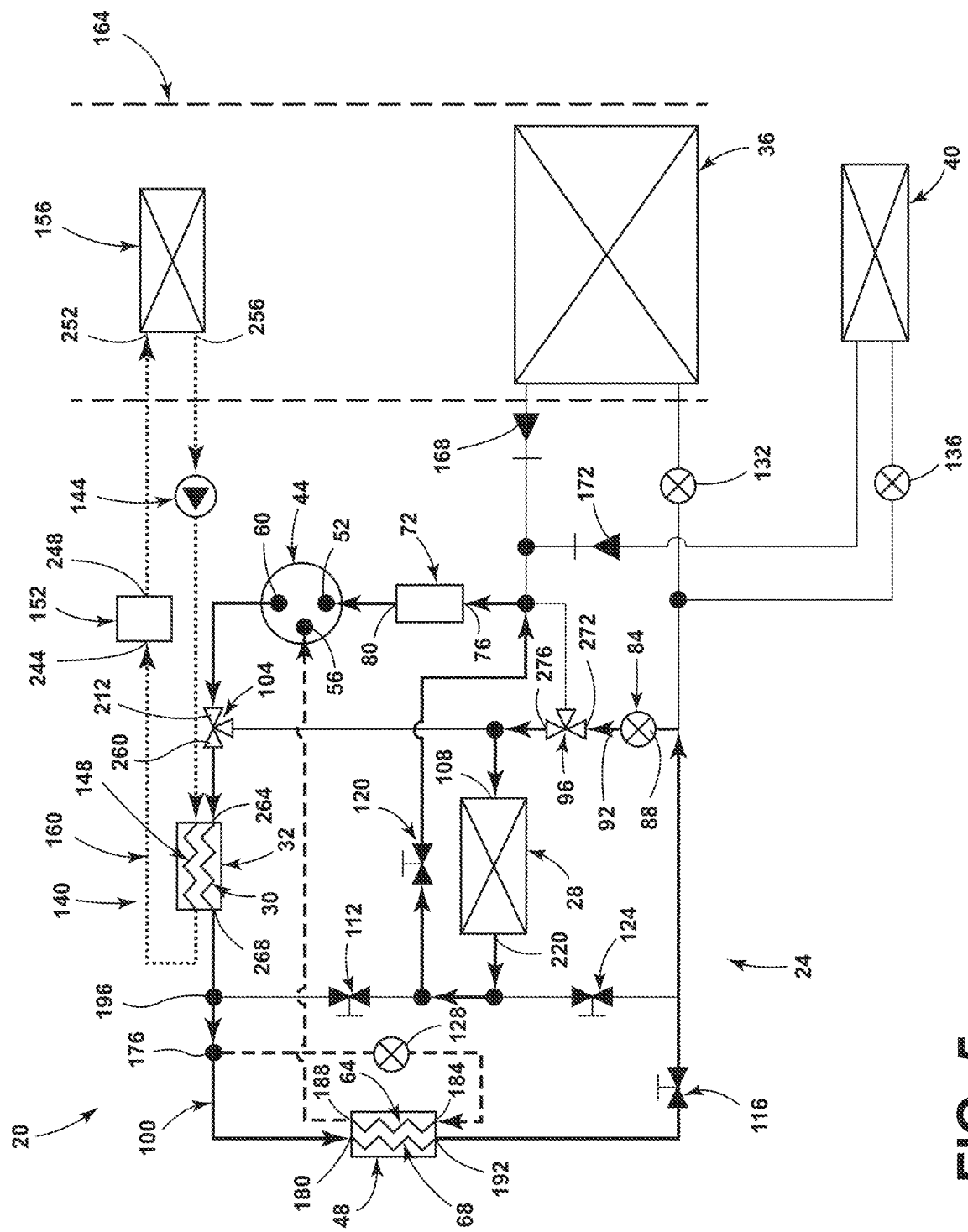
FIG. 5 is a schematic representation of the heat pump arrangement, illustrating a heating mode of operation, according to one example.

With particular reference to FIG. 4, the cabin and battery cooling mode of operation is depicted according to one example. The third shutoff valve 120 and the fourth shutoff valve 124 are closed in this mode of operation. Similarly, the first three-way valve 96 is placed in a position such that the first heat exchange fluid does not flow through the first-three way valve 96. In some examples, the first expansion valve 84 may be operated as a shutoff valve to prevent flow of the first heat exchange fluid to the first three-way valve 96. Accordingly, from the second shutoff valve 116, the first heat exchange fluid is directed toward the third expansion valve 132 by the refrigerant network of conduits 100. On the way to the third expansion valve 132, the first heat exchange fluid encounters the second branching point 232. At the second branching point 232, a first portion of the first heat exchange fluid is directed toward the fourth expansion valve 136 and a second portion of the first heat exchange fluid is directed toward the third expansion valve 132. The first portion of the first heat exchange fluid experiences a decrease in pressure and temperature as a result of interaction with the fourth expansion valve 136. Similarly, the second portion of the first heat exchange fluid experiences a decrease in pressure and temperature as a result of the interaction with the third expansion valve 132. After exiting the third expansion valve 132, the first heat exchange fluid is directed toward the inlet 224 of the third heat exchanger 36. The decreased temperature and pressure of the first heat exchange fluid flowing through the third heat exchanger 36 can be employed to provide cooling to air that is flowing through the ductwork 164 with which the third heat exchanger 36 is in fluid communication. Accordingly, the first heat exchange fluid that exits the third heat exchanger 36 by way of the outlet 228 of the third heat exchanger 36 may have an increased pressure, temperature, and/or vapor percentage than the first heat exchange fluid that entered the third heat exchanger 36 at the inlet 224. Upon exiting the third heat exchanger 36 by way of the outlet 228, the first heat exchange fluid is directed toward the first check valve 168.

Referring again to FIG. 4, after exiting the fourth expansion valve 136, the first heat exchange fluid is directed toward the inlet 236 of the fourth heat exchanger 40. The decreased temperature and pressure of the first heat exchange fluid flowing through the fourth heat exchanger 40 as a result of interaction with the fourth expansion valve 136 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 240 of the fourth heat exchanger 40 may have an increased pressure, temperature, and/or vapor percentage when compared to the first heat exchange fluid that entered the fourth heat exchanger 40 at the inlet 236. Upon exiting the fourth heat exchanger 40 by way of the outlet 240, the first heat exchange fluid is directed toward the second check valve 172 by the refrigerant network of conduits 100. Once the first heat exchange fluid has passed through the first and second check valves 168, 172, the first portion of the first heat exchange fluid that was directed toward the fourth heat exchanger 40 is rejoined or recombined with the second portion of the first heat exchange fluid that was directed toward the third heat exchanger 36. The first check valve 168 prevents backflow or excessive back pressure at the outlet 228 of the third heat exchanger 36. Similarly, the second check valve 172 prevents back flow or excessive back pressure at the outlet 240 of the fourth heat exchanger 40. From the first and second check valves 168, 172, the first heat exchange fluid is directed toward the accumulator 72. The accumulator 72 receives the first heat exchange fluid and provides a gaseous component of the first heat exchange fluid to the low-pressure inlet 52 of the compressor 44, thereby completing the traversal of the refrigerant loop 24 in the cabin and battery cooling mode of operation.

Referring now to FIGS. 5-9, 14-17, and 19, various modes of operation of the heat pump 20 that employ the coolant loop 140 are depicted. The pump 144 is activated in these modes of operation such that a second heat exchange fluid is circulated through the components of the coolant loop 140. The second heat exchange fluid is driven from the pump 144 toward the second heat exchanger 32. Accordingly, the second heat exchange fluid thermally interacts with the first heat exchange fluid by way of the second heat exchanger 32. More specifically, the second heat exchange fluid is circulated through the second region 148 of the second heat exchanger 32 while the first heat exchange fluid is circulated through the first region 30 of the second heat exchanger 32. In various examples, the second heat exchange fluid may extract heat from the first heat exchange fluid at the second heat exchanger 32. From the second heat exchanger 32, the second heat exchange fluid is directed to an inlet 244 of the reservoir 152 by the coolant network of conduits 160. The reservoir 152 can accumulate the second heat exchange fluid. An outlet 248 of the reservoir 152 is plumbed to an inlet 252 of the fifth heat exchanger 156 by the coolant network of conduits 152. In various examples, additional components can be included with the coolant loop 140 and plumbed between the outlet 248 of the reservoir 152 and the inlet 252 of the fifth heat exchanger 156, as will be discussed in further detail herein.

Referring again to FIGS. 5-9, 14-17, and 19, an outlet 256 of the fifth heat exchanger 156 is plumbed to the pump 144. Accordingly, as the pump 144 is operated, the second heat exchange fluid is pulled from the reservoir 152 and into the inlet 252 of the fifth heat exchanger 156 in a siphon-like manner. Said another way, operation of the pump 144 may generate a positive pressure at the inlet 244 of the reservoir 152 and a negative pressure at the outlet 248 of the reservoir 152. Therefore, the pressure differential across the reservoir 152 can facilitate the introduction of the second heat exchange fluid into the inlet 252 of the fifth heat exchanger 156. In some examples, additional components can be included with the coolant loop 140 and plumbed between the outlet 256 of the fifth heat exchanger 156 and the pump 144. The second heat exchange fluid can provide heat to a cabin of a vehicle as a result of the fluid communication between the fifth heat exchanger 156 and the ductwork 164. For example, the fifth heat exchanger 156 may operate as a heater core. Alternatively, heat from the second heat exchange fluid may be transferred from the fifth heat exchanger 156 to components that can benefit from such heat, such as batteries or electrical components during cold weather conditions in the environment within which the vehicle or the heat pump 20 currently occupies at a given time.

Figure 6:
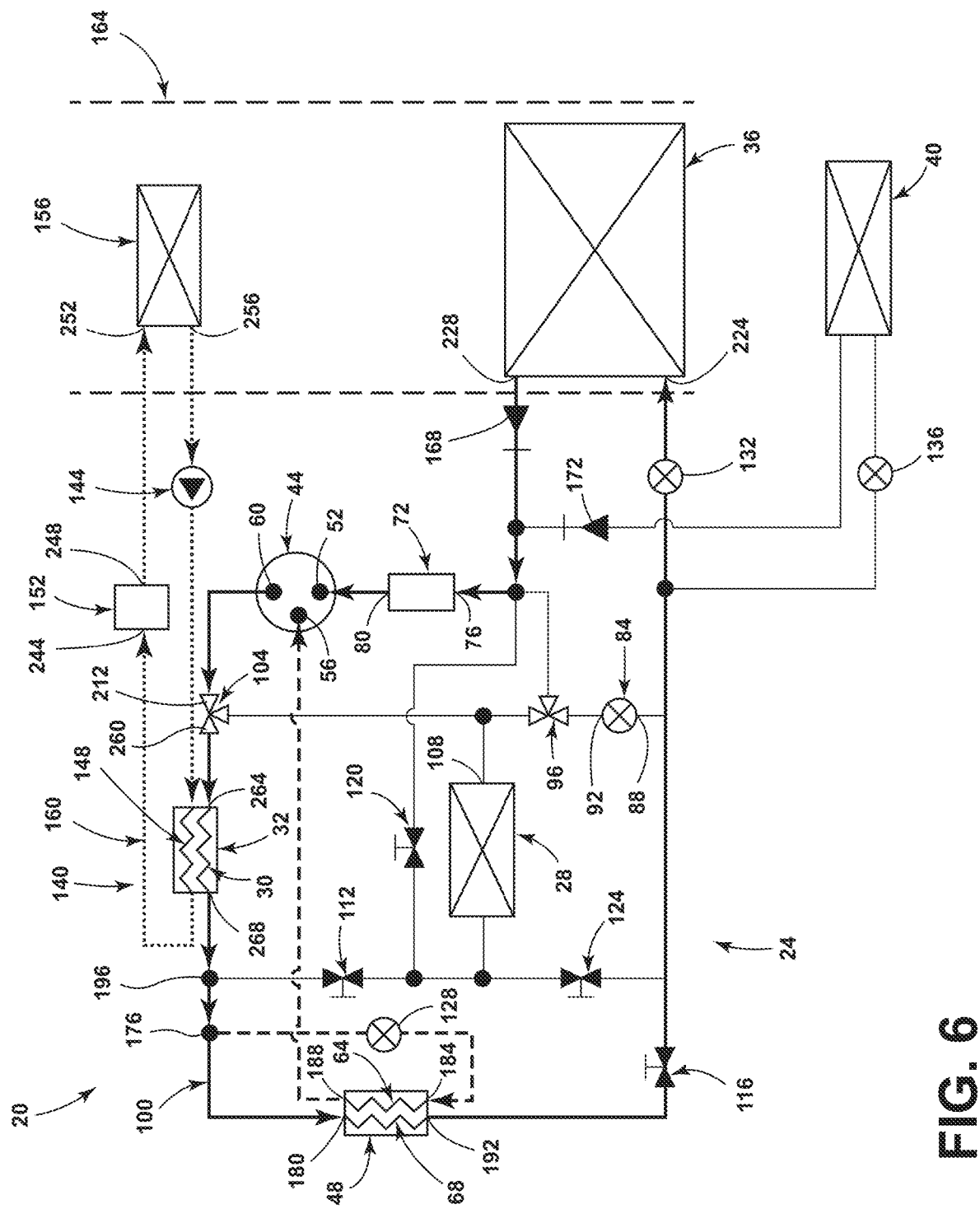
FIG. 6 is a schematic representation of the heat pump arrangement, illustrating a first reheat mode of operation, according to one example.
Figure 7:
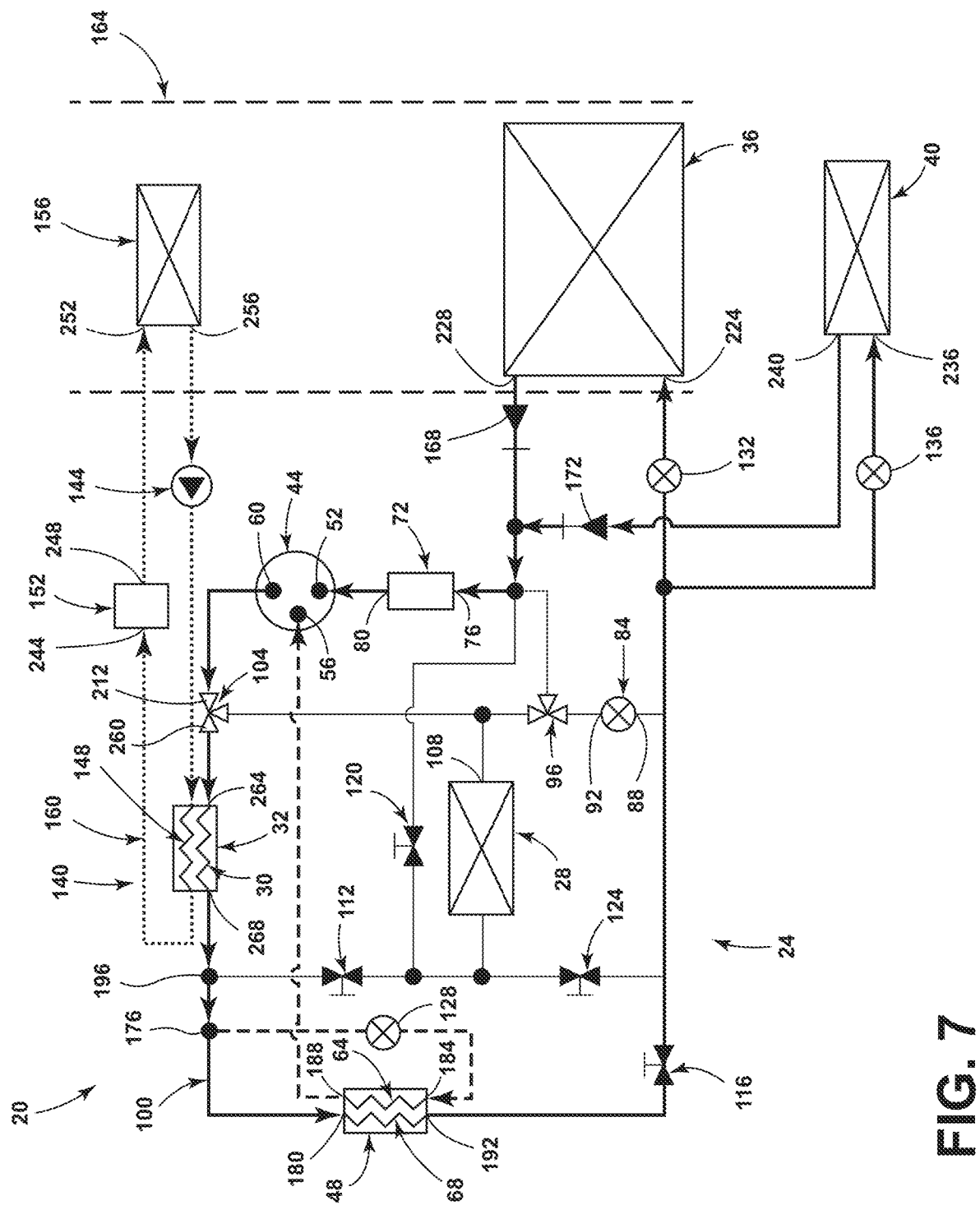
FIG. 7 is a schematic representation of the heat pump arrangement, illustrating a second reheat mode of operation, according to one example.
Figure 8:
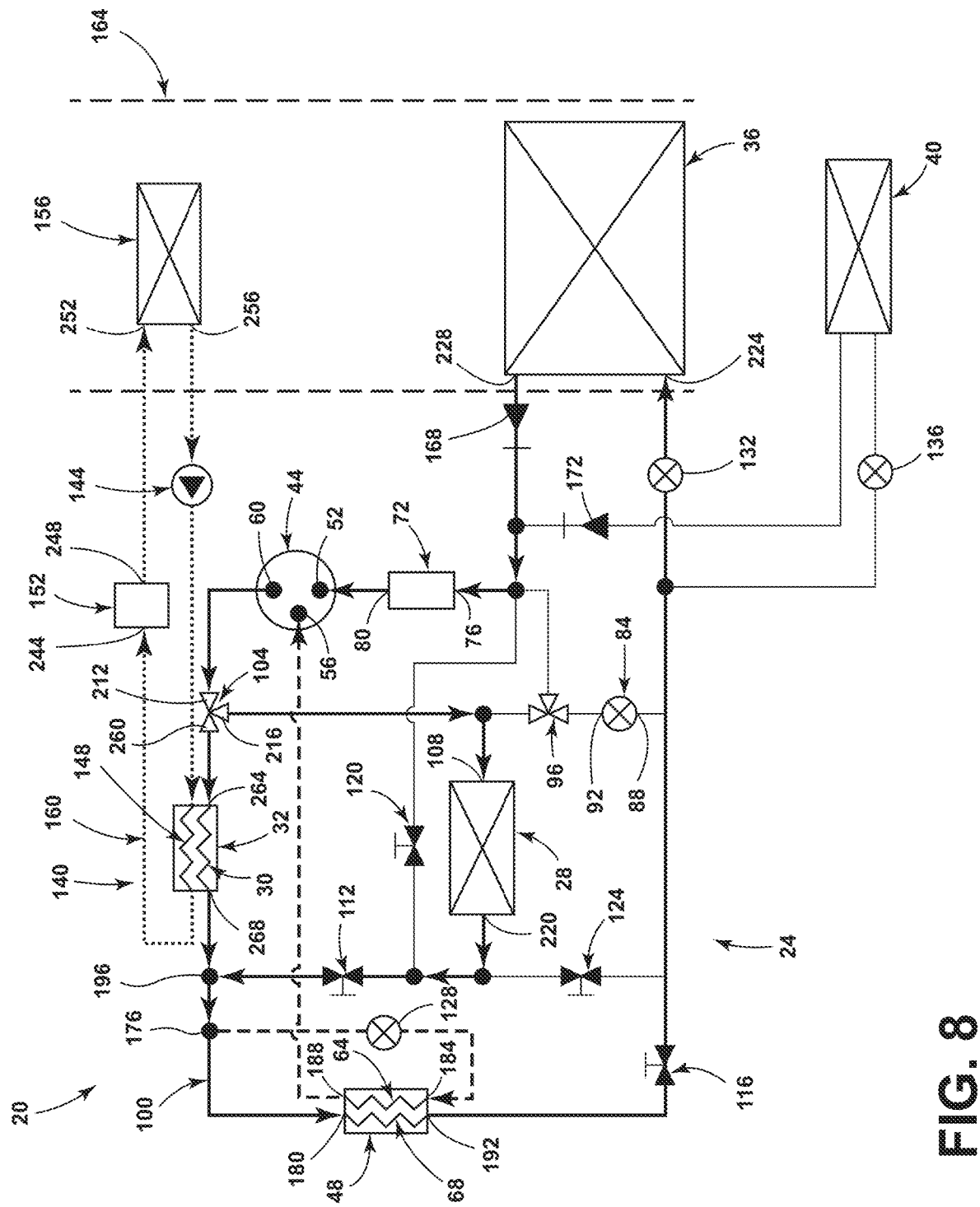
FIG. 8 is a schematic representation of the heat pump arrangement, illustrating a third reheat mode of operation, according to one example.
Figure 9:
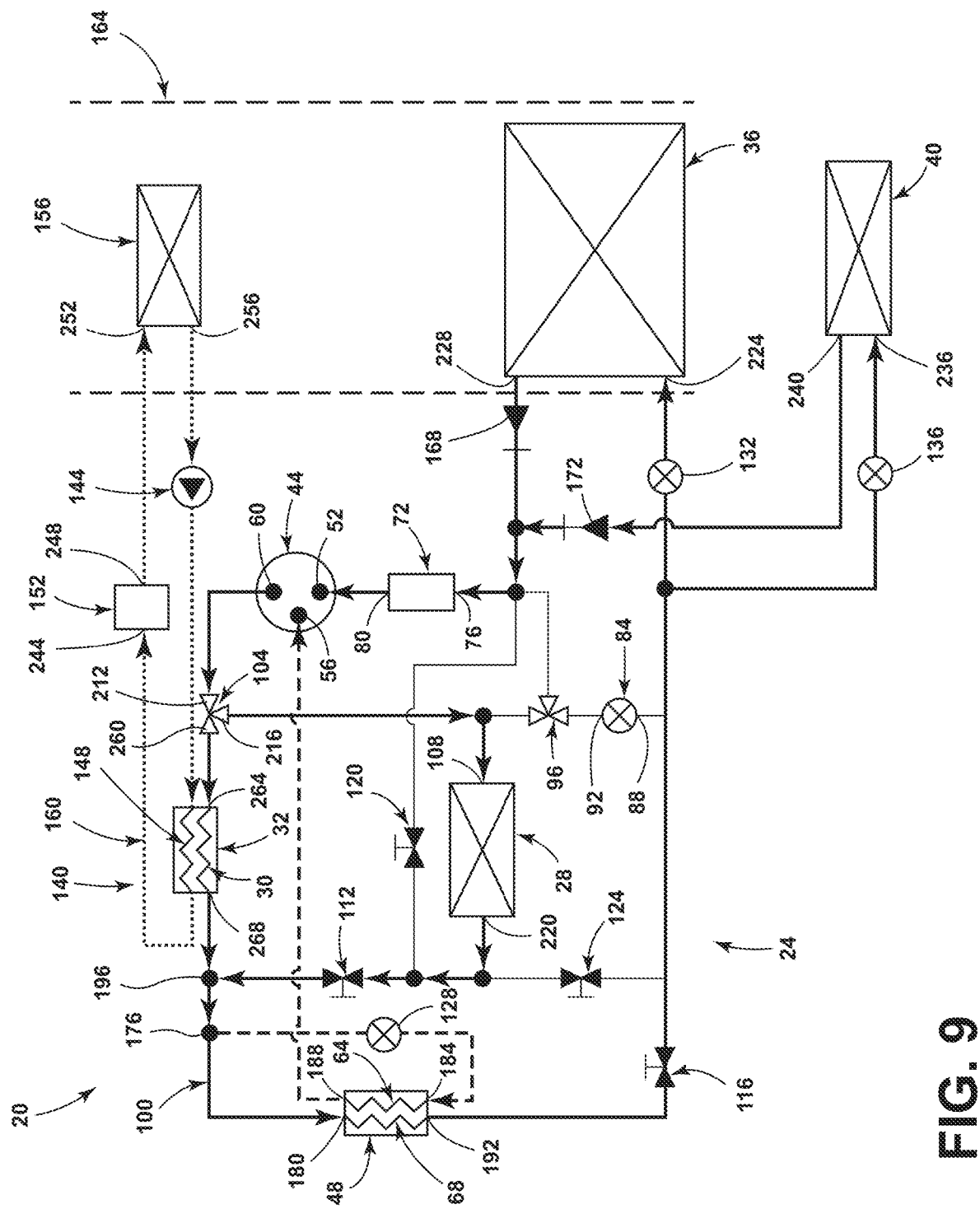
FIG. 9 is a schematic representation of the heat pump arrangement, illustrating a fourth reheat mode of operation, according to one example.

Referring further to FIGS. 5-9, 14-17, and 19, the compressor 44 acts upon the first heat exchange fluid to drive the first heat exchange fluid from the outlet 60 of the compressor 44 toward the first port 212 of the second three-way valve 104. The positioning of the second three-way valve 104 in the modes of operation depicted in FIGS. 5-7, 14-17, and 19 is such that an entirety of the first heat exchange fluid that is received at the first port 212 is directed out of a third port 260 of the second three-way valve 104. The positioning of the second three-way valve 104 in the modes of operation depicted in FIGS. 8 and 9 is such that a first portion of the first heat exchange fluid that is received at the first port 212 is directed out of the second port 216 and a second portion of the first heat exchange fluid that is received at the first port 212 is directed out of the third port 260, as will be discussed in further detail herein. In each of the modes of operation depicted in FIGS. 5-9, 14-17, and 19, from the third port 260 of the second three-way valve 104, the first heat exchange fluid is directed toward an inlet 264 of the first region 30 of the second heat exchanger 32. After thermally interacting with the second heat exchange fluid in the second heat exchanger 32, the first heat exchange fluid exits the first region 30 of the second heat exchanger 32 by way of an outlet 268 of the first region 30. Upon exiting the first region 30 of the second heat exchanger 32, the first heat exchange fluid is directed toward the first coupling point 196. At the first coupling point 196, the first heat exchange fluid is prevented from flowing toward the first shutoff valve 112 by the first shutoff valve 112 being in a closed position (FIGS. 5-7, 14-17, and 19) or by a pressure of the first heat exchange fluid flowing from the first shutoff valve 112 (FIGS. 8 and 9). In some examples, from the first coupling point 196, the first heat exchange fluid is directed toward the first branching point 176. In various examples, from the first coupling point 196, the first heat exchange fluid is directed toward the second expansion valve 128.

Referring still further to FIGS. 5-9, 14-17, and 19, for examples that include the first branching point 176, as the first heat exchange fluid encounters the first branching point 176, a portion of the first heat exchange fluid is diverted toward the second expansion valve 128, while the remaining portion of the first heat exchange fluid continues toward the second region 68 of the vapor generator 48. In various examples, the portion of the first heat exchange fluid that is diverted toward the second expansion valve 128 can be expressed as a ratio or percentage. For example, expressing the ratio as a percentage of the first heat exchange fluid that is diverted toward the second expansion valve 128, the second expansion valve 128 can receive about 5%, about 10%, about 15%, about 20%, about 25%, about 30%, about 35%, about 40%, about 45%, about 50%, about 55%, or about 60% of the first heat exchange fluid that encounters the first branching point 176. The remainder, or balancing percentage, of the first heat exchange fluid that encounters the first branching point 176 and is not diverted toward the second expansion valve 128 can continue toward the second region 68 of the vapor generator 48. It is contemplated that in different modes of operation of the heat pump 20, the percentage of the first heat exchange fluid that is received by the second expansion valve 128 may vary. It is further contemplated that the second expansion valve 128 may operate as a shutoff valve in some modes of operation such that an entirety of the first heat exchange fluid that encounters the first branching point 176 is directed toward the second region 68 of the vapor generator 48, effectively bypassing the generation of vapor for injection at the mid-pressure inlet 56.

Referring yet again to FIGS. 5-9, 14-17, and 19, the portion of the first heat exchange fluid that is diverted toward the second expansion valve 128 flows through the second expansion valve 128 and is directed toward the inlet 184 of the first region 64 of the vapor generator 48. This diverted portion of the first heat exchange fluid flows through the first region 64 and exits the vapor generator 48 at the outlet 188 of the first region 64 of the vapor generator 48. The portion of the first heat exchange fluid that was diverted toward the second expansion valve 128 decreases in pressure and temperature as a result of interaction with the second expansion valve 128. Accordingly, the first heat exchange fluid flowing through the first region 64 of the vapor generator 48 has a lower pressure and temperature than the first heat exchange fluid flowing through the second region 68. Therefore, the first heat exchange fluid within the first region 64 thermally interacts with the first heat exchange fluid flowing through the second region 68 of the vapor generator 48.

Referring again to FIGS. 5-9, 14-17, and 19, as a result of the thermal interaction between the first heat exchange fluid within the first region 64 and the first heat exchange fluid within the second region 68, the first heat exchange fluid within the first region 64 exits the vapor generator 48 at the outlet 188 of the first region 64 at a higher temperature, pressure, and/or vapor percentage than the first heat exchange fluid that entered the inlet 184 of the first region 64. The first heat exchange fluid that exits the first region 64 by way of the outlet 188 is directed toward the mid-pressure inlet 56 of the compressor 44. The first heat exchange fluid from the first region 64 of the vapor generator 48 is injected into the compressor 44 in a gaseous state. The injection of the first heat exchange fluid at the mid-pressure inlet 56 of the compressor 44 can improve efficiency of the refrigerant loop 24 and/or increase a heat exchange capacity of the refrigerant loop 24. For example, the injection of the first heat exchange fluid at the mid-pressure inlet 56 of the compressor 44 can increase a condensing capacity of the refrigerant loop 24 while decreasing a load experienced by the compressor 44. The improved condensing capacity of the refrigerant loop 24 and the decreased load on the compressor 44 can contribute to performance and efficiency improvements for the heat pump 20 and/or the refrigerant loop 24. Additionally, the injection of the first heat exchange fluid at the mid-pressure inlet 56 can increase an ambient temperature operating range of the heat pump 20 and/or the refrigerant loop 24.

Referring further to FIGS. 5-9, 14-17, and 19, the portion of the first heat exchange fluid that was not diverted toward the second expansion valve 128 and instead flowed toward the inlet 180 of the second region 68 of the vapor generator 48 thermally interacts with the first heat exchange fluid that was diverted toward the second expansion valve 128. During this thermal interaction between the first heat exchange fluid within the second region 68 and the first exchange fluid within the first region 64, heat is transferred from the first heat exchange fluid within the second region 68 to the first heat exchange fluid within the first region 64. Accordingly, the first heat exchange fluid exiting the vapor generator 48 at the outlet 192 of the second region 68 may be at a different temperature, pressure, and/or vapor percentage than the first heat exchange fluid that entered the inlet 180. For example, the first heat exchange fluid that exits the vapor generator 48 at the outlet 192 of the second region 68 may have a lower temperature and pressure than when the first heat exchange fluid entered the inlet 180 of the second region 68. Upon exiting the outlet 192 of the second region 68, the first heat exchange fluid is directed toward the second shutoff valve 116. The first heat exchange fluid flows through the second shutoff valve 116 as a result of the second shutoff valve 116 being in the open position.

Referring yet again to FIGS. 5-9, 14-17, and 19, in various examples that omit the first branching point 176 (see FIG. 2B), the first heat exchange fluid that passes through the first coupling point 196 is directed toward the second expansion valve 128. The first heat exchange fluid decreases in pressure and temperature as a result of interaction with the second expansion valve 128. Upon exiting the second expansion valve 128, the first heat exchange fluid is directed toward the inlet 200 of the vapor generator 48. The vapor generator 48 operates in the manner already described above with regard to the first outlet 204 and the second outlet 208. Accordingly, for the sake of brevity, such description is not repeated here.

With specific reference to FIGS. 5, 14-17, and 19, heating or reheat modes of operation are depicted in exemplary form. From the second shutoff valve 116, the first heat exchange fluid is directed toward the first expansion valve 84. In the modes of operation depicted in FIGS. 5, 14-16, and 19, the third and fourth expansion valves 132, 136 are operated as shutoff valves such that the third and fourth heat exchangers 36, 40 do not receive the first heat exchange fluid that is driven by the compressor 44. In the mode of operation depicted in FIG. 17, the first expansion valve 84 and the third expansion valve 132 receive the first heat exchange fluid, whereas the fourth expansion valve 136 operates as a shutoff valve. The first heat exchange fluid experiences a decreases in pressure and temperature as a result of interaction with the first expansion valve 84. Similarly, the first heat exchange fluid experiences a decreases in pressure and temperature as a result of interaction with the third expansion valve 132 in the mode of operation depicted in FIG. 17.

Referring again to FIGS. 5, 14-17, and 19, as the flow of the first heat exchange fluid from the third expansion valve 132, through the third heat exchanger 36, and ultimately to the accumulator 72 has been described above, the same is omitted here for the sake of brevity. From the first expansion valve 84, the first heat exchange fluid is directed toward a first port 272 of the first three-way valve 96. The positioning of the first three-way valve 96 in these modes of operation is such that the first heat exchange fluid received at the first port 272 is directed out of a second port 276 of the first three-way valve 96. From the second port 276, the first heat exchange fluid is directed toward the inlet 108 of the first heat exchanger 28. Within the first heat exchanger 28, the first heat exchange fluid may absorb heat from fluid with which the first heat exchanger 28 is additionally in contact (e.g., ambient air that is exterior to a vehicle). The first and fourth shutoff valves 112, 124 are each in a closed position in this mode of operation. However, the third shutoff valve 120 is in an open position in these modes of operation, which results in the first heat exchange fluid being directed toward the accumulator 72 upon exiting the first heat exchanger 28 by way of the outlet 220 thereof. The first and second check valves 168, 172 prevent back flow toward the third heat exchanger 36 and the fourth heat exchanger 40, respectively, in the modes of operation depicted in FIGS. 5, 14-16, and 19. Accordingly, the third and fourth heat exchangers 36, 40 are prevented from becoming storage vessels for the first heat exchange fluid when the third and fourth heat exchangers 36, 40 are not employed in a given mode of operation. In FIG. 17, the second check valve 172 prevents back flow toward the fourth heat exchanger 40. Accordingly, the fourth heat exchanger 40 is prevented from becoming a storage vessel for the first heat exchange fluid when the fourth heat exchanger 40 is not employed in a given mode of operation. The accumulator 72 performs as outlined previously. The gaseous component of the first heat exchange fluid is introduced into the compressor 44 from the accumulator 72 by way of the low-pressure inlet 52.

Referring to FIGS. 6-9, various modes of operation that employ the third heat exchanger 36 are depicted in exemplary form. More specifically, a first reheat mode of operation (FIG. 6), a second reheat mode of operation (FIG. 7), a third reheat mode of operation (FIG. 8), and a fourth reheat mode of operation (FIG. 9) are depicted. In each of these modes of operation, the third shutoff valve 120 and the fourth shutoff valve 124 are closed in these modes of operation. Similarly, the first three-way valve 96 is placed in a position such that the first heat exchange fluid does not flow through the first-three way valve 96. In some examples, the first expansion valve 84 may be operated as a shutoff valve to prevent flow of the first heat exchange fluid to the first three-way valve 96. In the examples depicted in FIGS. 6 and 8, the fourth expansion valve 136 can operate as a shutoff valve such that the first heat exchange fluid does not pass through the fourth expansion valve 136. Accordingly, from the second shutoff valve 116, the first heat exchange fluid is directed toward the third expansion valve 132. In FIGS. 6 and 8, an entirety of the first heat exchange fluid that exits the second shutoff valve 116 is directed toward the third expansion valve 132. In FIGS. 7 and 9, a portion of the first heat exchange fluid that exits the second shutoff valve 116 is diverted toward the fourth expansion valve 136 at the second branching point 232, as will be discussed in further detail herein. The first heat exchange fluid experiences a decrease in pressure and temperature as a result of interaction with the third expansion valve 132. After exiting the third expansion valve 132, the first heat exchange fluid is directed toward the inlet 224 of the third heat exchanger 36.

Referring again to FIGS. 6-9, the decreased temperature and pressure of the first heat exchange fluid flowing through the third heat exchanger 36 can be employed to provide cooling to air that is flowing through the ductwork 164 with which the third heat exchanger 36 is in fluid communication. Accordingly, the first heat exchange fluid that exits the third heat exchanger 36 by way of the outlet 228 of the third heat exchanger 36 may have an increased pressure, temperature, and/or vapor percentage than the first heat exchange fluid that entered the third heat exchanger 36 at the inlet 224. The cooling of the air within the ductwork 164 that is provided by the third heat exchanger 36 in these modes of operation can be employed as a way of controlling a humidity level within the air circulated through the ductwork 164 (e.g., dehumidification). For example, the cooling of the air within the ductwork 164 that is provided by the third heat exchanger 36 can result in condensing of at least some gaseous components of the air (e.g., water vapor) passing through the ductwork 164. Upon exiting the third heat exchanger 36 by way of the outlet 228, the first heat exchange fluid flows through the first check valve 168. After exiting the first check valve 168, the first heat exchange fluid is directed toward the accumulator 72 by the refrigerant network of conduits 100. In FIGS. 6 and 8, the second check valve 172 prevents back flow toward the fourth heat exchanger 40 in these modes of operation. Accordingly, the fourth heat exchanger 40 is prevented from becoming a storage vessel for the first heat exchange fluid when the fourth heat exchanger 40 is not employed in a given mode of operation. The accumulator 72 receives the first heat exchange fluid and provides a gaseous component of the first heat exchange fluid to the low-pressure inlet 52 of the compressor 44.

Referring specifically to FIGS. 7 and 9, from the second shutoff valve 116, the first heat exchange fluid is directed toward the third expansion valve 132 by the refrigerant network of conduits 100. On the way to the third expansion valve 132, the first heat exchange fluid encounters the second branching point 232. At the second branching point 232, a first portion of the first heat exchange fluid is directed toward the fourth expansion valve 136 and a second portion of the first heat exchange fluid is directed toward the third expansion valve 132. The first portion of the first heat exchange fluid experiences a decrease in pressure and temperature as a result of interaction with the fourth expansion valve 136. The flow of the second portion has already been discussed with regard to these modes of operation and is omitted here for the sake of brevity. After exiting the fourth expansion valve 136, the first heat exchange fluid is directed toward the inlet 236 of the fourth heat exchanger 40. The decreased temperature and pressure of the first heat exchange fluid flowing through the fourth heat exchanger 40 as a result of interaction with the fourth expansion valve 136 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 240 of the fourth heat exchanger 40 may have an increased pressure, temperature, and/or vapor percentage when compared to the first heat exchange fluid that entered the fourth heat exchanger 40 at the inlet 236.

Referring again to FIGS. 7 and 9, upon exiting the fourth heat exchanger 40 by way of the outlet 240, the first heat exchange fluid is directed toward the second check valve 172 by the refrigerant network of conduits 100. Once the first heat exchange fluid has passed through the first and second check valves 168, 172, the first portion of the first heat exchange fluid that was directed toward the fourth heat exchanger 40 is rejoined or recombined with the second portion of the first heat exchange fluid that was directed toward the third heat exchanger 36. The first check valve 168 prevents backflow or excessive back pressure at the outlet 228 of the third heat exchanger 36. Similarly, the second check valve 172 prevents back flow or excessive back pressure at the outlet 240 of the fourth heat exchanger 40. From the first and second check valves 168, 172, the first heat exchange fluid is directed toward the accumulator 72. The accumulator 72 receives the first heat exchange fluid and provides the gaseous component of the first heat exchange fluid to the low-pressure inlet 52 of the compressor 44.

Referring now to FIGS. 8 and 9, as mentioned above, the positioning of the second three-way valve 104 in these modes of operation is such that the first portion of the first heat exchange fluid that is received at the first port 212 is directed out of the second port 216 and the second portion of the first heat exchange fluid that is received at the first port 212 is directed out of the third port 260. As the flow of the first heat exchange fluid from the third port 260 has already been discussed, focus is now turned to the flow of the first heat exchange fluid from the second port 216. After exiting the second port 216 of the second three-way valve 104, the first heat exchange fluid is directed toward the inlet 108 of the first heat exchanger 28. As the first heat exchange fluid flows through the first heat exchanger 28, the first heat exchange fluid may thermally interact with a heat exchange fluid that is external to the refrigerant loop 24 and the coolant loop 140 (e.g., ambient air) such that heat may be exchanged with the first heat exchange fluid (e.g., heat absorbed by the first heat exchange fluid or heat dissipated from the first heat exchange fluid). The first heat exchange fluid exits the first heat exchanger 28 at the outlet 220 of the first heat exchanger 28.

Referring again to FIGS. 8 and 9, upon exiting the first heat exchanger 28 by way of the outlet 220, the first heat exchange fluid is directed toward the first shutoff valve 112. In each of these modes of operation, the first shutoff valve 112 is in the open position while the third and fourth shutoff valves 120, 124 are in the closed position. After flowing through the first shutoff valve 112, the first heat exchange fluid passes through the first coupling point 196 that is downstream of the first region 30 of the second heat exchanger 32. Depending on the particular example, the first coupling point 196 is upstream of the second expansion valve 128 and/or the first branching point 176. At the first coupling point 196, the first and second portions of the first heat exchange fluid are recombined with one another. From the first coupling point 199, the first heat exchange fluid is directed toward the second expansion valve 128 and/or the first branching point 176. At the first branching point 176, when present, the first heat exchange fluid is diverted in the manner already described with regard to the second expansion valve 128 and the vapor generator 48 that includes the first and second regions 64, 68.

Figure 10:
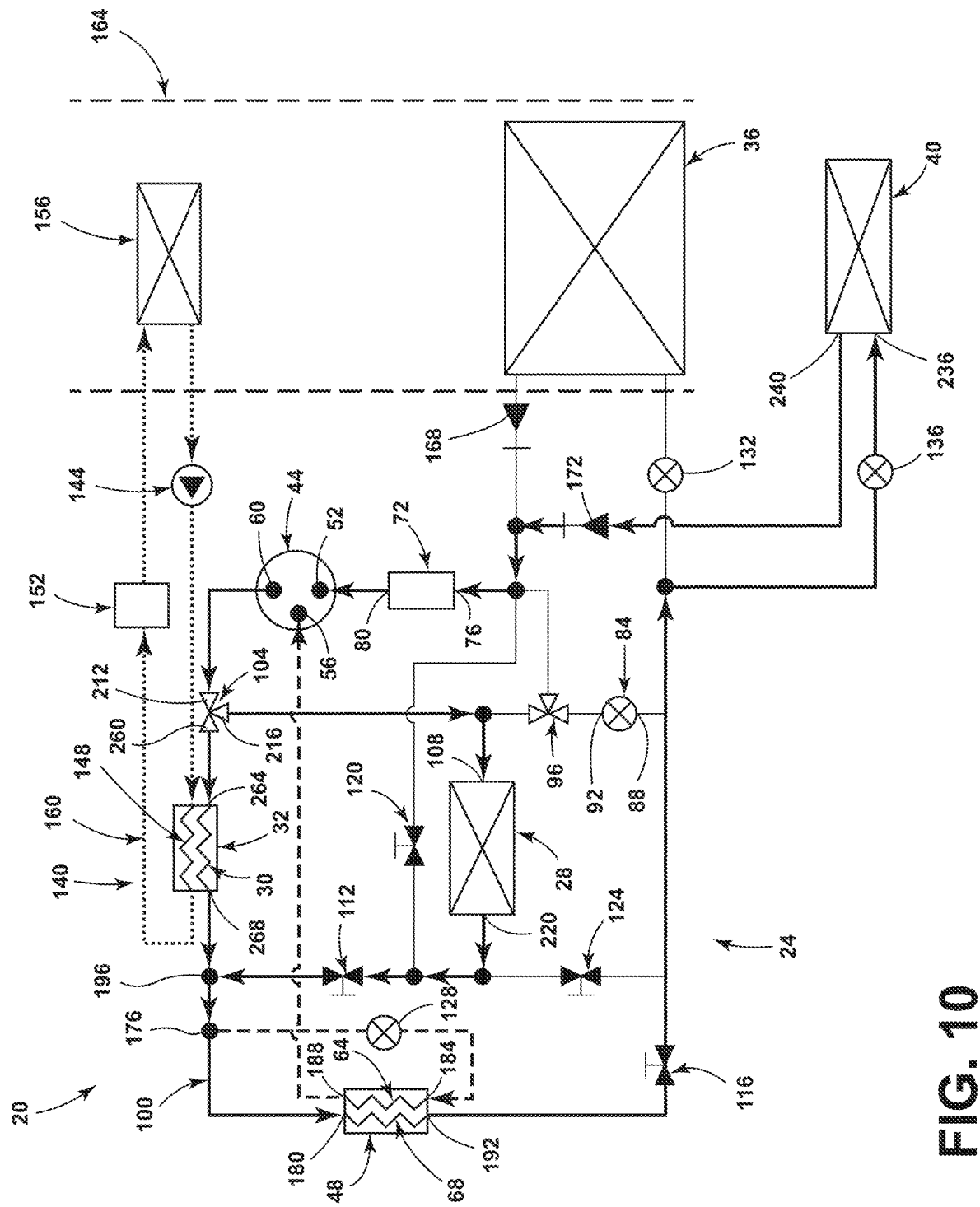
FIG. 10 is a schematic representation of the heat pump arrangement, illustrating a reheat and deicing mode of operation, according to one example.
Figure 11:
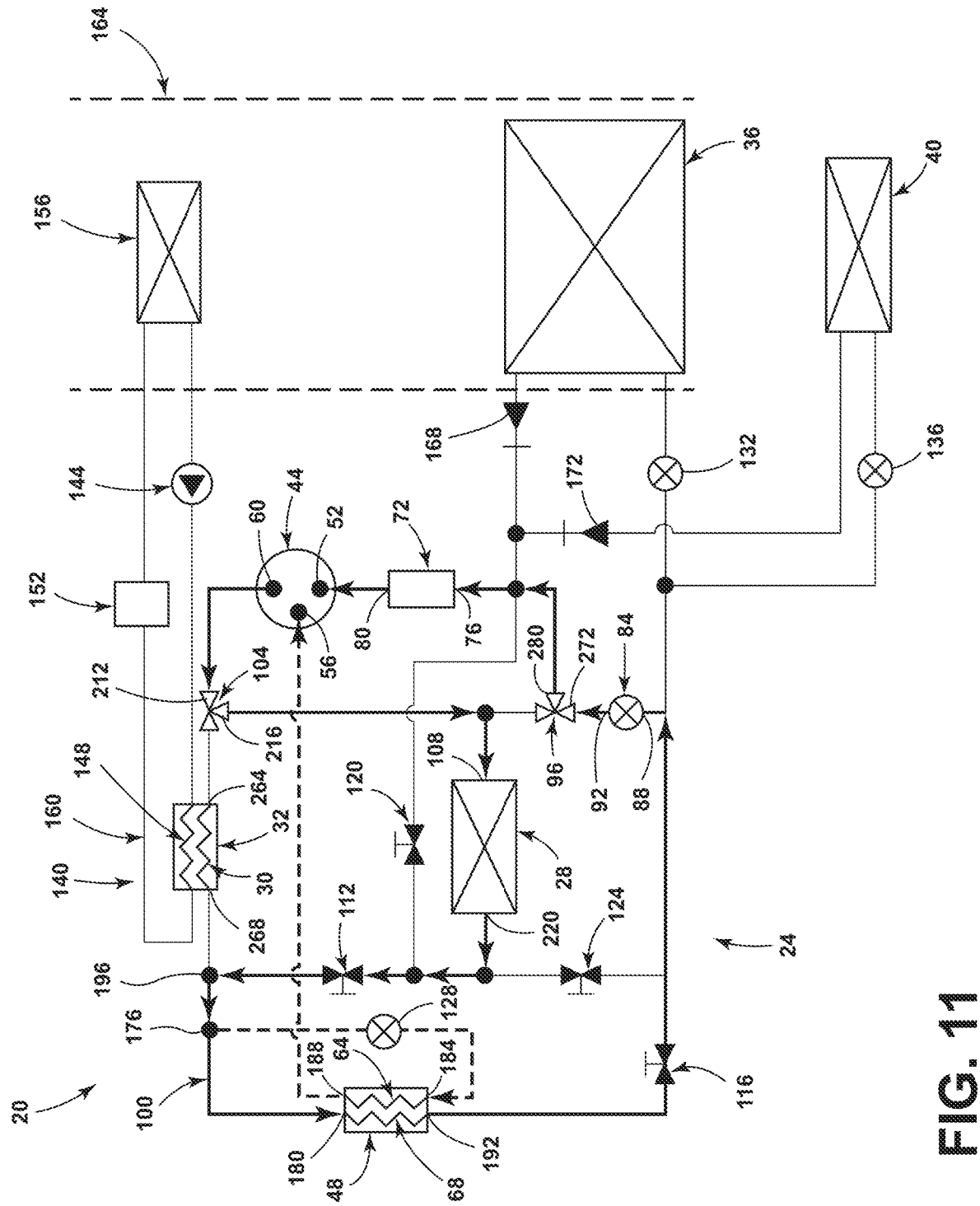
FIG. 11 is a schematic representation of the heat pump arrangement, illustrating a first deicing mode of operation, according to one example.
Figure 12:
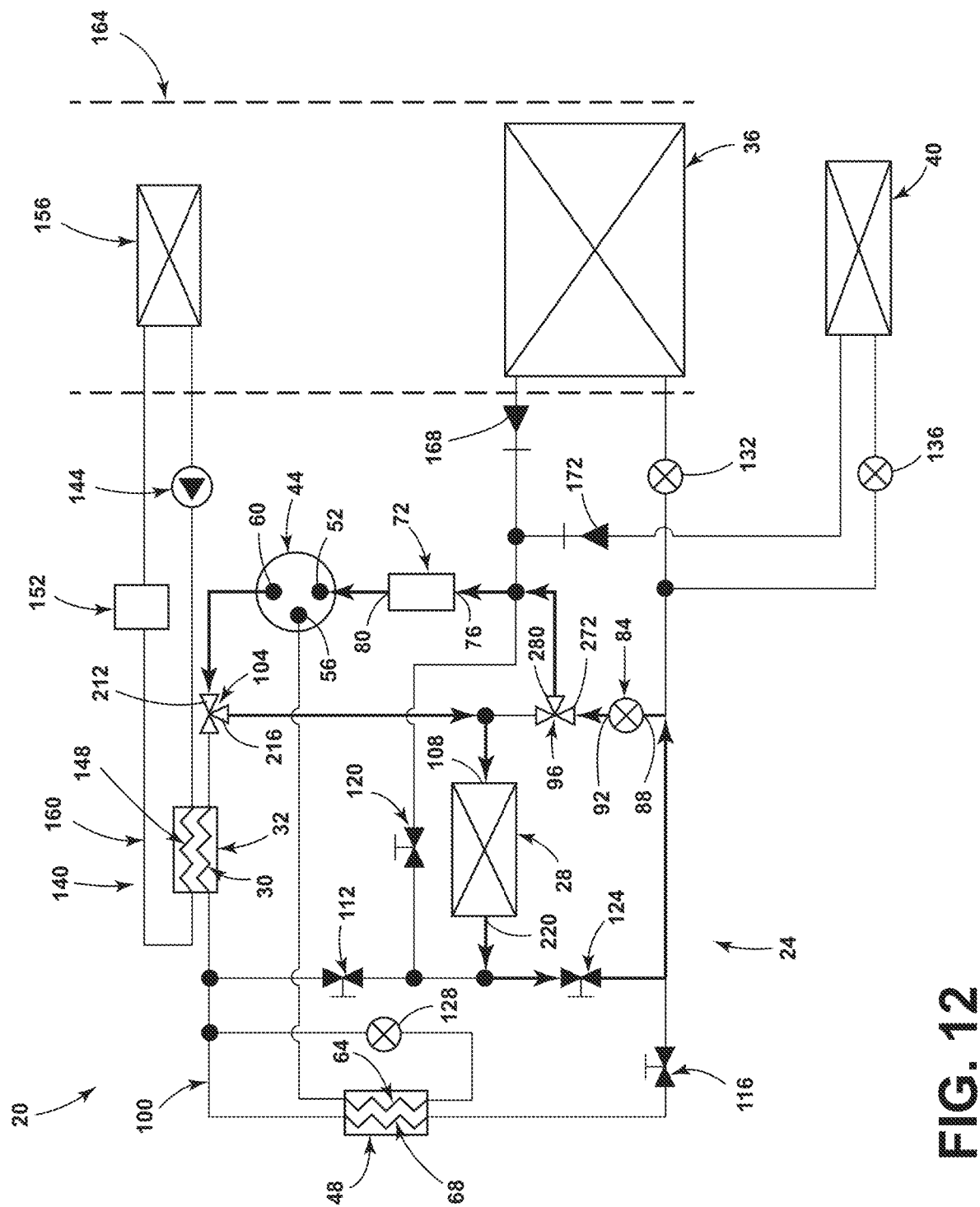
FIG. 12 is a schematic representation of the heat pump arrangement, illustrating a second deicing mode of operation, according to one example.
Figure 13:
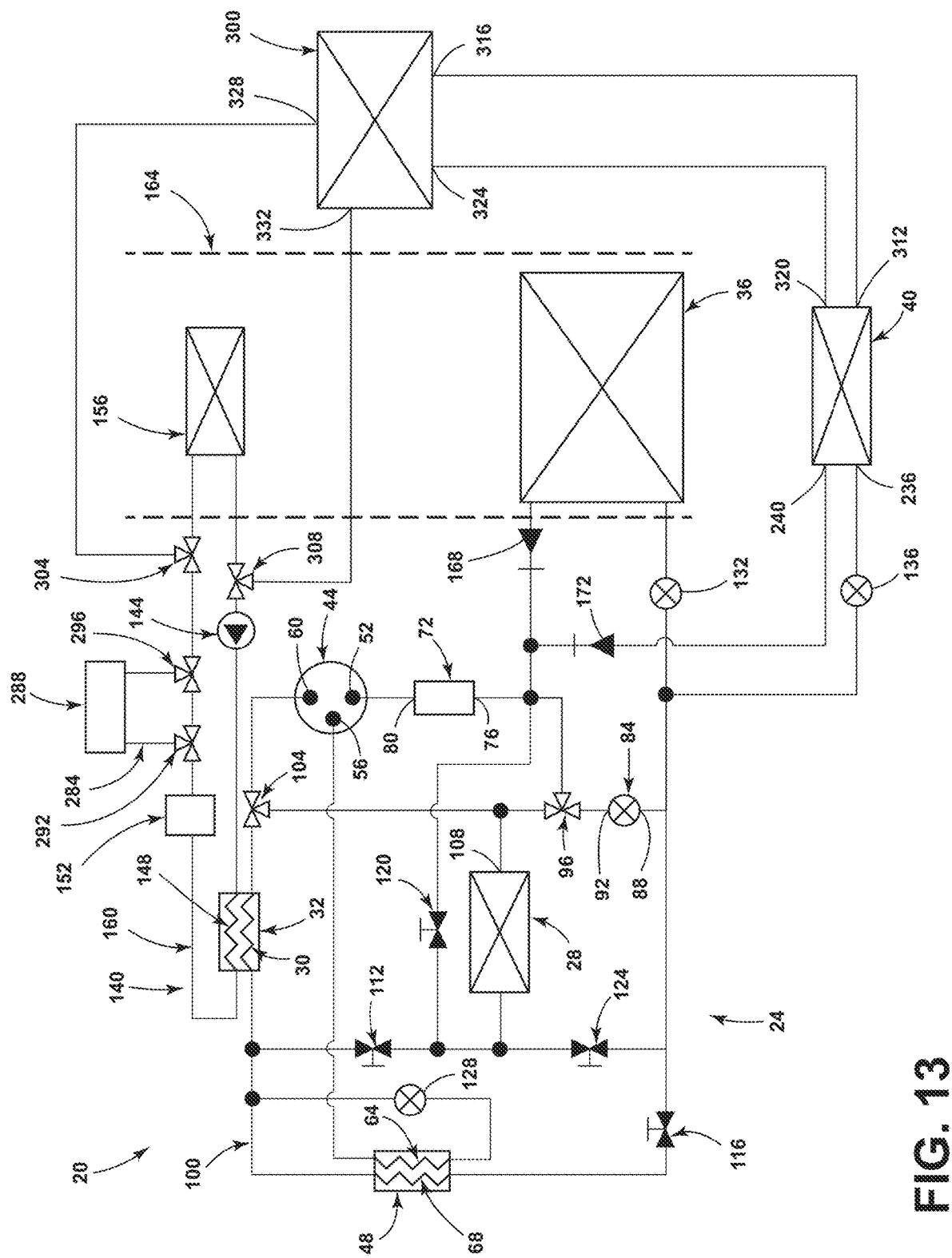
FIG. 13 is a schematic representation of the heat pump arrangement, illustrating the refrigerant loop and the coolant loop, according to another example.

Referring to FIGS. 10-12, a reheat and deicing mode of operation (FIG. 10), a first deicing mode of operation (FIG. 11), and a second deicing mode of operation (FIG. 12) are depicted in exemplary form. In each of these modes of operation, the compressor 44 acts upon the first heat exchange fluid to drive the first heat exchange fluid from the outlet 60 toward the second three-way valve 104. More specifically, the compressor 44 drives the first heat exchange fluid toward the first port 212 of the second three-way valve 104. The positioning of the second three-way valve 104 in the mode of operation depicted in FIG. 10 is such that a first portion of the first heat exchange fluid that is received at the first port 212 is directed out of the second port 216 and a second portion of the first heat exchange fluid that is received at the first port 212 is directed out of the third port 260, as will be discussed in further detail herein. As a result of the positioning of the second three-way valve 104 in the modes of operation depicted in FIGS. 11 and 12, an entirety of the first heat exchange fluid that is received at the first port 212 is directed to exit the second three-way valve 104 at the second port 216 thereof.

In each of the modes of operation depicted in FIGS. 10-12, after exiting the second port 216 of the second three-way valve 104, the first heat exchange fluid is directed toward the inlet 108 of the first heat exchanger 28. As the first heat exchange fluid flows through the first heat exchanger 28, the first heat exchange fluid may thermally interact with a heat exchange fluid that is external to the refrigerant loop 24 and the coolant loop 140 (e.g., ambient air) such that heat may be removed from the first heat exchange fluid. The first heat exchange fluid exits the first heat exchanger 28 at the outlet 220 of the first heat exchanger 28. Upon exiting the first heat exchanger 28 by way of the outlet 220, the first heat exchange fluid is directed toward the first shutoff valve 112. In the modes of operation depicted in FIGS. 10 and 11, the first shutoff valve 112 is in an open position. Accordingly, in the modes of operation depicted in FIGS. 10 and 11, the first heat exchange fluid flows through the first shutoff valve 112 and encounters the first coupling point 196. In the mode of operation depicted in FIG. 12, the first shutoff valve 112 is in a closed position. In each of the modes of operation depicted in FIGS. 10-12, the third shutoff valve 120 is in a closed position.

With specific reference to FIG. 10, the positioning of the second three-way valve 104 in this mode of operation is such that the first portion of the first heat exchange fluid that is received at the first port 212 is directed out of the second port 216 and the second portion of the first heat exchange fluid that is received at the first port 212 is directed out of the third port 260. From the third port 260 of the second three-way valve 104, the first heat exchange fluid is directed toward the inlet 264 of the first region 30 of the second heat exchanger 32. Within the second heat exchanger 32, the first heat exchange fluid thermally interacts with the second heat exchange fluid that is circulating through the coolant loop 140. The operation of the coolant loop 140 has been described above and operates in an identical manner in the depicted example. Accordingly, for the sake of brevity, the description of the operation of the coolant loop 140 is not repeated here. After thermally interacting with the second heat exchange fluid in the second heat exchanger 32, the first heat exchange fluid exits the first region 30 of the second heat exchanger 32 by way of the outlet 268 of the first region 30. Upon exiting the first region 30 of the second heat exchanger 32, the first heat exchange fluid is directed toward the first coupling point 196. At the first coupling point 196, the first heat exchange fluid is prevented from flowing toward the first shutoff valve 112 by a pressure of the first heat exchange fluid flowing from the first shutoff valve 112. At the first coupling point 196, the first and second portions of the first heat exchange fluid are recombined.

Referring to FIGS. 10 and 11, from the first coupling point 196, the first heat exchange fluid is directed toward the second expansion valve 128 and/or the first branching point 176, if employed. In examples that include the first branching point 176, as the first heat exchange fluid encounters the first branching point 176, a portion of the first heat exchange fluid is diverted toward the second expansion valve 128, while the remaining portion of the first heat exchange fluid continues toward the second region 68 of the vapor generator 48 in the manner already described. From the vapor generator 48, the first heat exchange fluid is directed toward the second shutoff valve 116.

With specific reference to FIG. 10, the fourth shutoff valve 124 is closed in this mode of operation. Similarly, the first three-way valve 96 is placed in a position such that the first heat exchange fluid does not flow through the first-three way valve 96. In some examples, the first expansion valve 84 may be operated as a shutoff valve to prevent flow of the first heat exchange fluid to the first three-way valve 96. In the depicted example, the third expansion valve 132 can operate as a shutoff valve such that the first heat exchange fluid does not pass through the third expansion valve 132. Accordingly, from the second shutoff valve 116, the first heat exchange fluid is directed toward the fourth expansion valve 136. More specifically, the first heat exchange fluid encounters the second branching point 232 where, as a result of the third expansion valve 132 operating as a shutoff valve, the first heat exchange fluid is diverted toward the fourth expansion valve 136. The first heat exchange fluid experiences a decrease in pressure and temperature as a result of interaction with the fourth expansion valve 136. After exiting the fourth expansion valve 136, the first heat exchange fluid is directed toward the inlet 236 of the fourth heat exchanger 40. The decreased temperature and pressure of the first heat exchange fluid flowing through the fourth heat exchanger 40 as a result of interaction with the fourth expansion valve 136 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 240 of the fourth heat exchanger 40 may have an increased pressure, temperature, and/or vapor percentage than the first heat exchange fluid that entered the fourth heat exchanger 40 at the inlet 236. Upon exiting the fourth heat exchanger 40 by way of the outlet 240, the first heat exchange fluid is directed toward the second check valve 172 by the refrigerant network of conduits 100. Once the first heat exchange fluid passes through the second check valve 172, the first heat exchange fluid is directed toward the accumulator 72. The first check valve 168 prevents back flow toward the third heat exchanger 36 in this mode of operation. Accordingly, the third heat exchanger 36 is prevented from becoming a storage vessel for the first heat exchange fluid when the third heat exchanger 36 is not employed in a given mode of operation. The accumulator 72 receives the first heat exchange fluid and provides a gaseous component of the first heat exchange fluid to the low-pressure inlet 52 of the compressor 44, thereby completing the traversal of the refrigerant loop 24 in the reheat and deicing mode of operation.

Referring particularly to FIG. 11, from the second shutoff valve 116, the first heat exchange fluid is directed toward the third expansion valve 132. However, the third and fourth expansion valves 132, 136 each operate as a shutoff valve in this mode of operation. Additionally, the fourth shutoff valve 124 is in a closed position. Accordingly, after exiting the second shutoff valve 116, the first heat exchange fluid is received at the inlet 88 of the first expansion valve 84. The first heat exchange fluid experiences a decreases in pressure and temperature as a result of interaction with the first expansion valve 84. From the first expansion valve 84, the first heat exchange fluid is directed toward the first port 272 of the first three-way valve 96. The positioning of the first three-way valve 96 in this mode of operation is such that the first heat exchange fluid received at the first port 272 is directed out of a third port 280 of the first three-way valve 96. From the third port 280, the first heat exchange fluid is directed toward the accumulator 72. Accordingly, the first heat exchange fluid is directed from the outlet 92 of the first expansion valve 84 to the inlet 76 of the accumulator 72 by the first three-way valve 96 in the first deicing mode of operation. The first and second check valves 168, 172 prevent back flow toward the third and fourth heat exchangers 36, 40. Accordingly, the third and fourth heat exchangers 36, 40 are prevented from becoming storage vessels for the first heat exchange fluid when the third and fourth heat exchangers 36, 40 are not employed in a given mode of operation. The accumulator 72 receives the first heat exchange fluid and provides a gaseous component of the first heat exchange fluid to the low-pressure inlet 52 of the compressor 44, thereby completing the traversal of the refrigerant loop 24 in the first deicing mode of operation.

Referring now to FIG. 12, the flow of the first heat exchange fluid from the outlet 60 of the compressor 44 to the outlet 220 of the first heat exchanger 28 has been described above and is not repeated here for the sake of brevity. In this mode of operation, the first, second, and third shutoff valves 112, 116, 120 are each in the closed position. Accordingly, upon exiting the first heat exchanger 28 by way of the outlet 220, the first heat exchange fluid is directed toward the fourth shutoff valve 124. In this mode of operation, the third and fourth expansion valves 132, 136 each operate as a shutoff valve such that the first heat exchange fluid is directed toward the first expansion valve 84 upon exiting the fourth shutoff valve 124. The first heat exchange fluid experiences a decreases in pressure and temperature as a result of interaction with the first expansion valve 84. From the first expansion valve 84, the first heat exchange fluid is directed toward the first port 272 of the first three-way valve 96. The positioning of the first three-way valve 96 in this mode of operation is such that the first heat exchange fluid received at the first port 272 is directed out of the third port 280 of the first three-way valve 96. From the third port 280, the first heat exchange fluid is directed toward the accumulator 72. Accordingly, the first heat exchange fluid is directed from the outlet 92 of the first expansion valve 84 to the inlet 76 of the accumulator 72 by the first three-way valve 96 in the second deicing mode of operation. The first and second check valves 168, 172 prevent back flow toward the third and fourth heat exchangers 36, 40. Accordingly, the third and fourth heat exchangers 36, 40 are prevented from becoming storage vessels for the first heat exchange fluid when the third and fourth heat exchangers 36, 40 are not employed in a given mode of operation. The accumulator 72 receives the first heat exchange fluid and provides a gaseous component of the first heat exchange fluid to the low-pressure inlet 52 of the compressor 44, thereby completing the traversal of the refrigerant loop 24 in the second deicing mode of operation.

Referring to FIGS. 13-19, various examples, the coolant loop 140 can include an auxiliary coolant loop 284. The auxiliary coolant loop 284 can include at least one heat-producing component (e.g., an engine, electronics, battery, battery pack, one or more heating elements, brakes, etc.). For example, the at least one heat-producing component may be a first heat-producing component 288. Heat from the first heat-producing component 288 can be transferred to the second heat exchange fluid when the second heat exchange fluid is exposed to the first heat-producing component 288. Whether the second heat exchange fluid is exposed to the first heat-producing component 288 can be controlled by a third three-way valve 292 and a fourth three-way valve 296. The third three-way valve 292 and the fourth three-way valve 296 operate to bypass the auxiliary coolant loop 284 or to direct the second heat exchange fluid through the auxiliary coolant loop 284, as directed or controlled by a control module. Various modes of operation can employ the auxiliary coolant loop 284, as will be discussed in further detail herein.

Referring again to FIGS. 13-19, the heat pump 20 can include a second heat-producing component 300. As with the first heat-producing component 288, the second heat-producing component 300 can be an engine, electronics, battery, battery pack, one or more heating elements, brakes, or the like. The second heat-producing component 300 receives the second heat exchange fluid. The second heat-producing component 300 may receive the second heat exchange fluid in modes of operation where the second heat-producing component 300 has not reached a thermal capacity thereof or in modes of operation where the second heat-producing component 300 is below an operating temperature thereof. For example, when the second heat-producing component 300 is a battery or a battery pack, the second heat-producing component 300 may have a significant thermal mass such that the second heat-producing component 300 can operate as a cold sink. Accordingly, while the second heat-producing component 300 is capable of operating as a cold sink, or has not reached the thermal capacity thereof, the second heat-producing component 300 can receive the second heat exchange fluid during modes of operation where it is desirable for the second heat exchange fluid to be cooled. In such examples, the second heat-producing component 300 may not be "asking" for thermal regulation but nonetheless receives a thermal change. Said another way, the current operating parameters (e.g., temperature) of the second heat-producing component 300 may not indicate to the control module, or "ask", that thermal regulation be undertaken for the benefit of the second heat-producing component 300 (e.g., operating efficiency). For example, a thermometer or thermostat may not be indicating to the control module that a thermal change of the second heat-producing component 300 is desirable with regard to operating parameters of the second heat-producing component 300. Rather, the control module may identify that the second heat-producing component 300 is in a cold sink state that can be employed for the overall benefit of the heat pump 20. Similarly, when the second heat-producing component 300 has a preferred operating temperature, or a preferred temperature range for operation, the second heat exchange fluid may be circulated through the second heat-producing component 300 in operating conditions or modes of operation where the second heat-producing component 300 is below such preferred operating temperature or temperature range. In such examples, the second heat-producing component 300 may be "asking" for thermal regulation, such as by input received by the control module from a thermometer or thermostat that is coupled to the second heat-producing component 300. One example of such a situation is when the thermal environment within which the heat pump 20 is located (e.g., outside weather conditions) are cold, such as during winter months, the second heat-producing component 300 may be heated by the second heat exchange fluid to achieve the desired operating temperature or temperature range.

Referring further to FIGS. 13-19, the second heat-producing component 300 can receive the second heat exchange fluid during modes of operation where it may be desirable to provide additional heat to the second heat exchange fluid and/or during modes of operation where the second heat-producing component 300 can benefit from decreasing a temperature of the second heat-producing component 300. Accordingly, heat produced by the second heat-producing component 300 may be harvested or scavenged to increase a temperature, pressure, and/or vapor percentage of the second heat exchange fluid. For example, during heating modes of operation, providing additional heat to the second heat exchange fluid may decrease an amount of time it takes to increase a temperature of the air passing through the ductwork 164 to a desired temperature. In some examples, the first heat-producing component 288 can be employed to heat the second heat-producing component 300. For example, the second heat-producing component 300 may be immediately downstream of the first heat-producing component 288. In examples, the second heat-producing component 300 can be plumbed in parallel with the fifth heat exchanger 156. In some examples, the second heat-producing component 300 can be plumbed in series with the fifth heat exchanger 156. In various examples, the second heat-producing component 300 can be plumbed in series and in parallel with the fifth heat exchanger 156.

Referring still further to FIGS. 13-19, in the depicted examples, a fifth three-way valve 304 and a sixth three-way valve 308 are employed to plumb the second heat-producing component 300 to the coolant network of conduits 160, as will be discussed in further detail herein. The fourth heat exchanger 40 can be directly plumbed to the second heat-producing component 300 by the refrigerant network of conduits 100. In the depicted examples, the inlet 236 of the fourth heat exchanger 40 may be a first inlet of the fourth heat exchanger 40 and the outlet 240 of the fourth heat exchanger 40 may be a first outlet of the fourth heat exchanger 40. A second outlet 312 of the fourth heat exchanger 40 can be immediately upstream of a first inlet 316 of the second heat-producing component 300. A second inlet 320 of the fourth heat exchanger 40 can be immediately downstream of a first outlet 324 of the second heat-producing component 300. A second inlet 328 of the second heat-producing component 300 is immediately downstream of the fifth three-way valve 304. A second outlet 332 of the second heat-producing component 300 is immediately upstream of the sixth three-way valve 308.

Referring yet again to FIGS. 13-19, in the depicted examples, the second heat exchange fluid may be circulated through the second heat-producing component 300 in some or all of the modes of operations outlined above that employed the fourth heat exchanger 40. For the sake of brevity, these modes of operation will not be repeated here. The thermodynamic conditions outlined with regard to the state of the first heat exchange fluid at the outlet 240 of the fourth heat exchanger 40 above generally apply in an inverse fashion to the thermodynamic conditions of the second heat exchange fluid at the second outlet 312 in the depicted examples. More specifically, the first and second heat exchange fluid exchange heat by way of the fourth heat exchanger 40. Accordingly, the second heat exchange fluid that exits the fourth heat exchanger 40 by way of the second outlet 312 may have a lower temperature, lower pressure, and/or lower vapor percentage than the second heat exchange fluid that entered the fourth heat exchanger 40 by way of the second inlet 320. The temperature, pressure, and/or vapor percentage of the second heat exchange fluid at the first outlet 324 of the second heat-producing component 300 may be greater than the temperature, pressure, and/or vapor percentage of the second heat exchange fluid at the first inlet 316 of the second heat-producing component 300.

Figure 14:
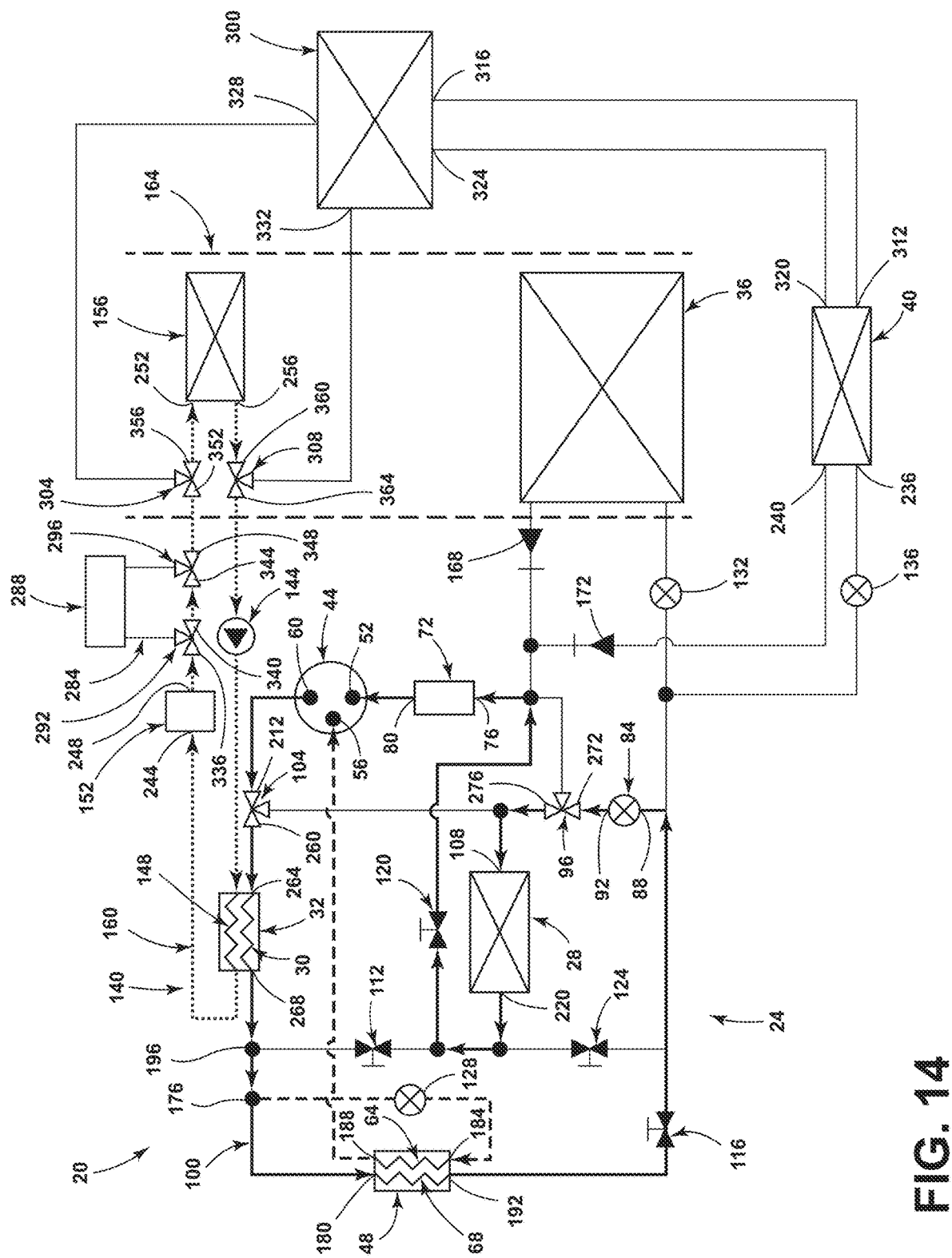
FIG. 14 is a schematic representation of the heat pump arrangement, illustrating a heating mode of operation, according to one example.

With specific reference to FIG. 14, a heating mode that does not employ the auxiliary coolant loop 284 is depicted in exemplary form. As the flow of the first heat exchange fluid through the refrigerant loop 24 in this mode of operation has already been described above, the same is not repeated here for the sake of brevity. The flow of the second heat exchange fluid through the coolant loop 140 has been largely described above. However, additional description with regard to the third three-way valve 292, the fourth three-way valve 296, the second heat-producing component 300, the fifth three-way valve 304, and the sixth three-way valve 308 is provided here. The positioning of the third three-way valve 292 in this mode of operation is such that the auxiliary coolant loop 284 is bypassed. More specifically, the third three-way valve 292 receives the second heat exchange fluid at a first port 336 of the third three-way valve 292. The positioning of the third three-way valve 292 in this mode of operation is such that an entirety of the second heat exchange fluid received at the first port 336 is directed to a second port 340 of the third three-way valve 292. After exiting the third-three way valve 292 by way of the second port 340, the second heat exchange fluid is directed to a first port 344 of the fourth three-way valve 296. The positioning of the fourth three-way valve 296 in this mode of operation is such that the second heat exchange fluid that is received at the first port 344 is directed out of a second port 348 of the fourth three-way valve 296. The fifth three-way valve 304 is positioned downstream of the second port 348 of the fourth three-way valve 296. The fifth three-way valve 304 is positioned upstream of the inlet 252 of the fifth heat exchanger 156 and upstream of the second inlet 328 of the second heat-producing component 300. The sixth three-way valve 308 is positioned downstream of the outlet 256 of the fifth heat exchanger 156 and downstream of the second outlet 332 of the second heat-producing component 300. In the depicted embodiment, the fifth heat exchanger 156 and the second heat-producing component 300 are plumbed in parallel.

Referring again to FIG. 14, from the second port 348 of the fourth three-way valve 296, the second heat exchange fluid is directed to a first port 352 of the fifth three-way valve 304. The positioning of the fifth three-way valve 304 in the depicted mode of operation is such that the second heat exchange fluid received at the first port 352 is directed to a second port 356 of the fifth three-way valve 304. Upon exiting the second port 356 of the fifth three-way valve 304, the second heat exchange fluid is directed to the inlet 252 of the fifth heat exchanger 156. Accordingly, the second heat-producing component 300 is bypassed in the depicted mode of operation. The fifth heat exchanger 156 performs as already described. Upon exiting the fifth heat exchanger 156 by way of the outlet 256, the second heat exchange fluid is directed to a first port 360 of the sixth three-way valve 308. The positioning of the sixth three-way valve 308 in this mode of operation is such that the second heat exchange fluid received at the first port 360 is directed to exit the sixth three-way valve 308 by way of a second port 364. Upon exiting the sixth three-way valve 308 by way of the second port 364, the second heat exchange fluid is directed to the pump 144, thereby completing traversal of the coolant loop 140.

Figure 15:
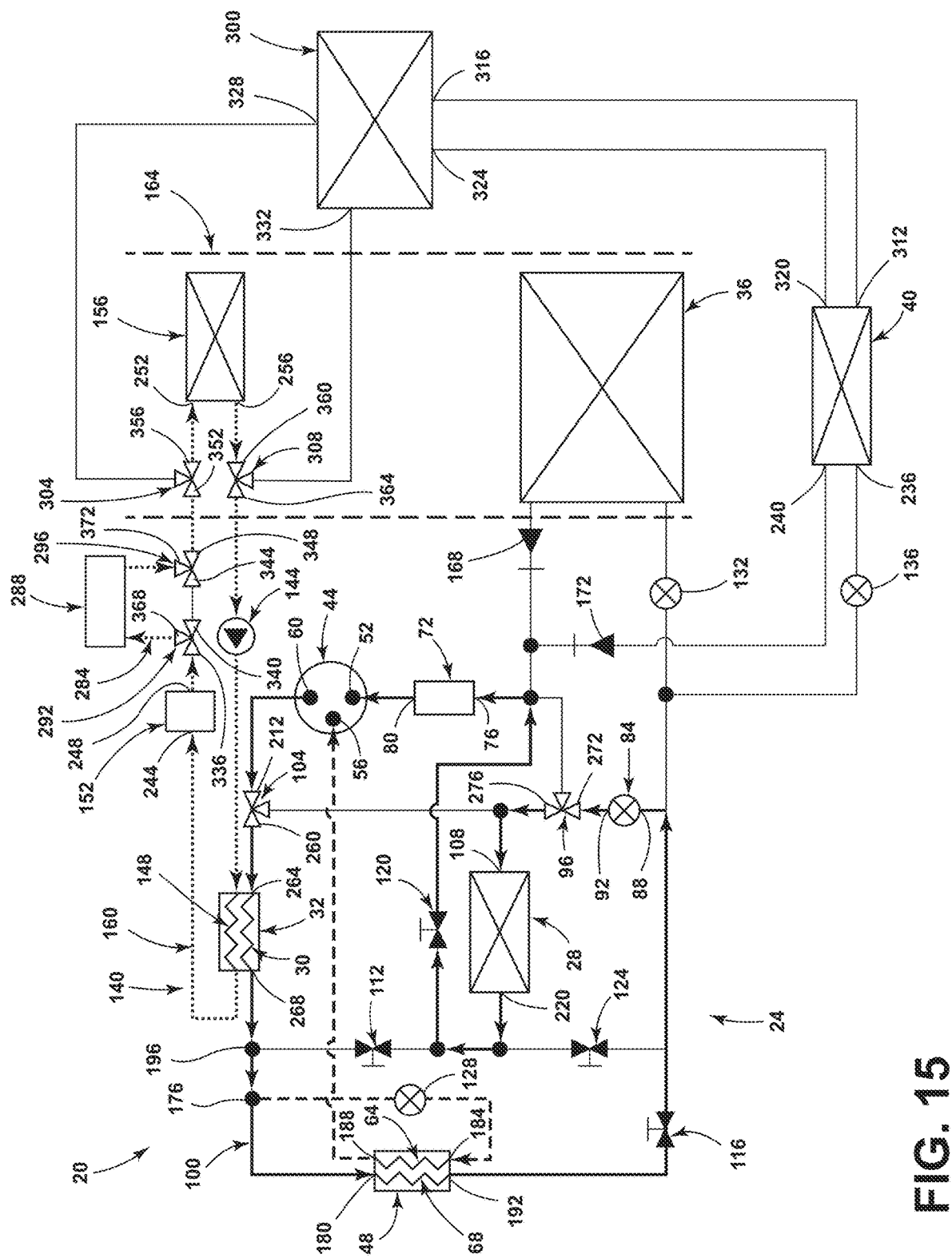
FIG. 15 is a schematic representation of the heat pump arrangement, illustrating a heating mode of operation that employs a first heat-producing component, according to one example.
Figure 16:
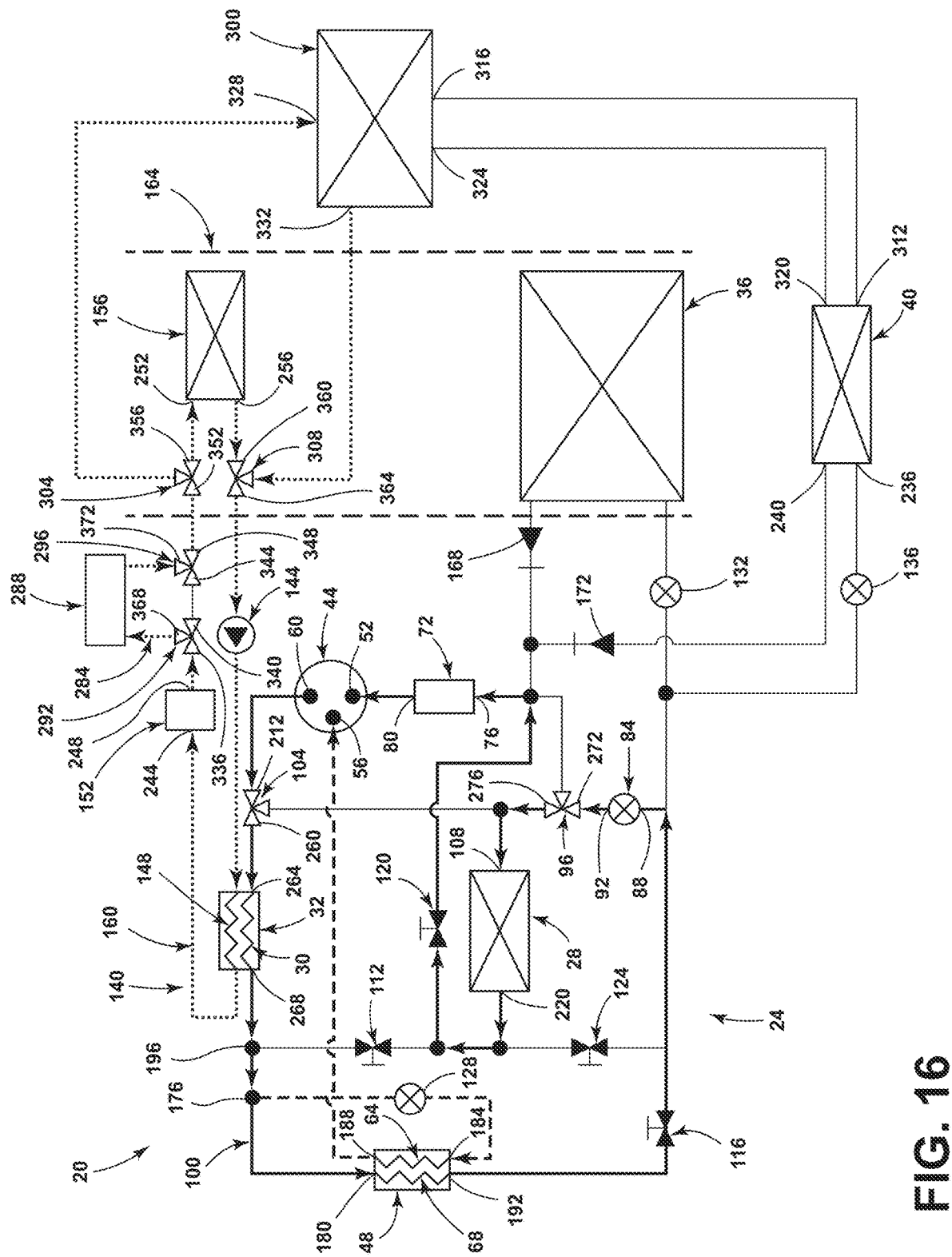
FIG. 16 is a schematic representation of the heat pump arrangement, illustrating a heating mode of operation that employs the first heat-producing component and a second heat-producing component, according to one example.
Figure 17:
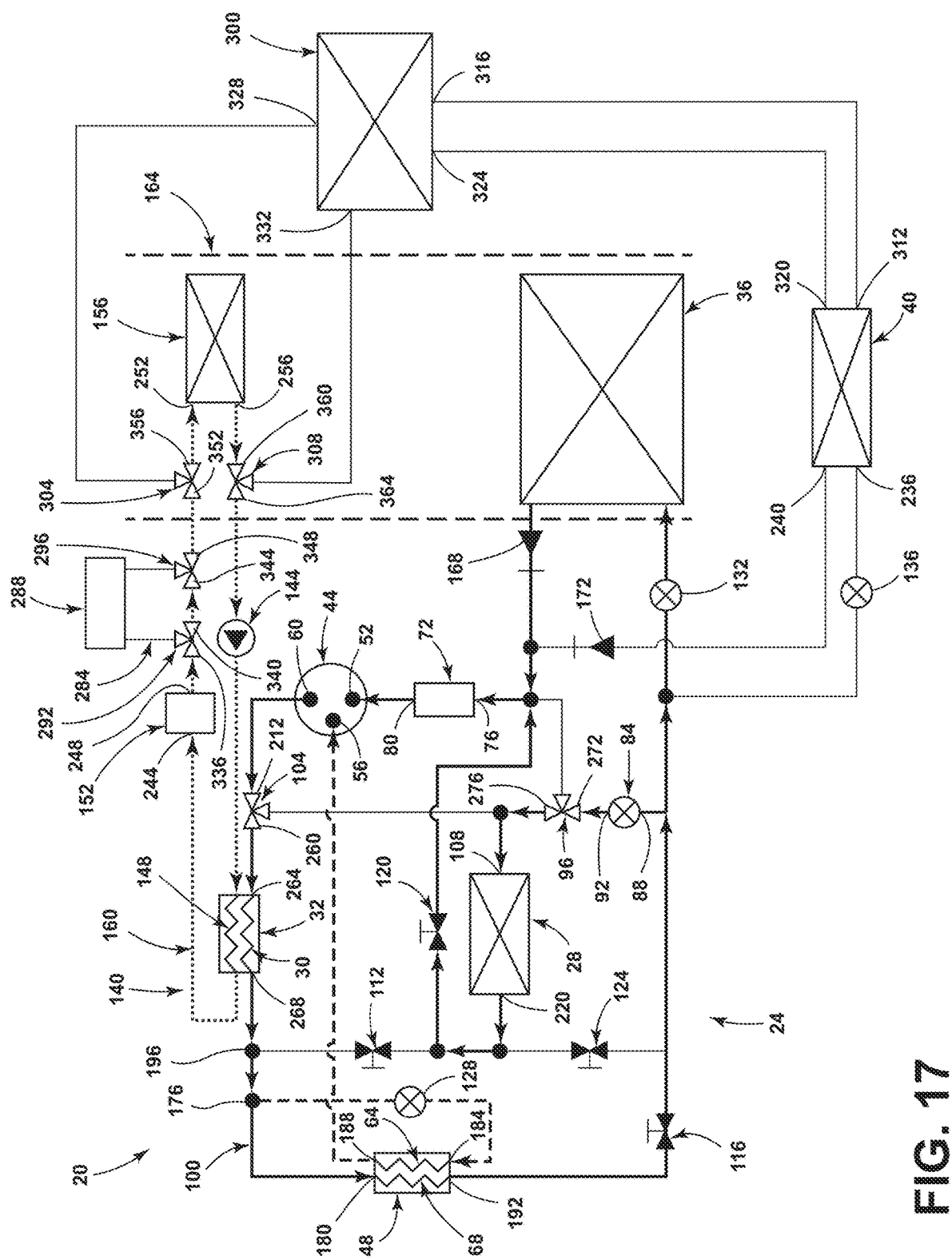
FIG. 17 is a schematic representation of the heat pump arrangement, illustrating a parallel evaporative reheat mode of operation, according to one example.
Figure 19:
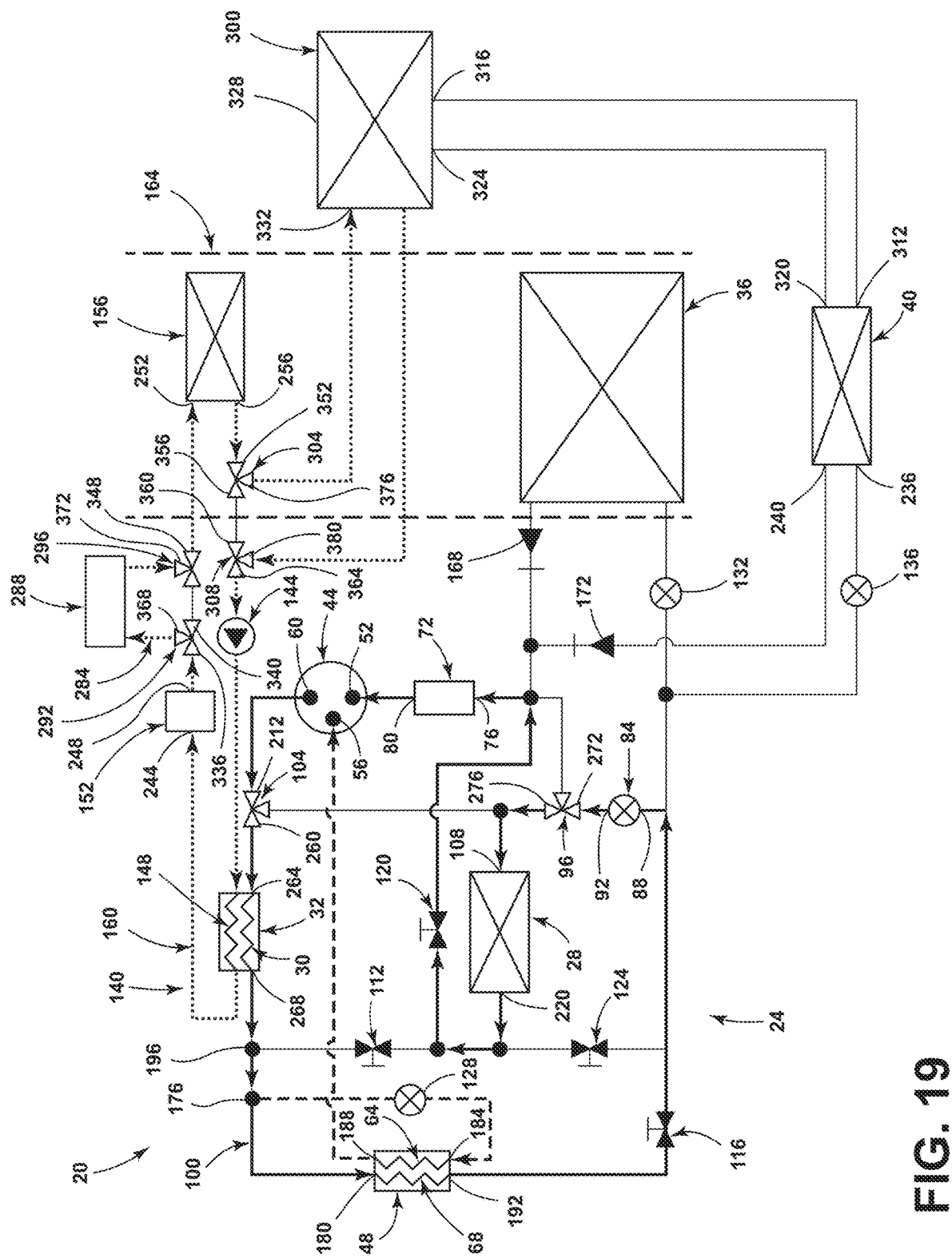
FIG. 19 is a schematic representation of the heat pump arrangement, illustrating a heating mode of operation that employs the first heat-producing component and the second heat-producing component, according to one example.

Referring now to FIGS. 15-16 and 19, various heating modes of operation that employ the auxiliary coolant loop 284 are depicted in exemplary form. As the flow of the first heat exchange fluid through the refrigerant loop 24 in these modes of operation has already been described above, the same is not repeated here for the sake of brevity. The flow of the second heat exchange fluid through the coolant loop 140 has been largely described above. However, additional description with regard to the first heat-producing component 288, the third three-way valve 292, and the fourth three-way valve 296 is provided here. The positioning of the third three-way valve 292 in these modes of operation is such that the auxiliary coolant loop 284 is utilized. More specifically, the third three-way valve 292 receives the second heat exchange fluid at the first port 336 of the third three-way valve 292 and an entirety of the second heat exchange fluid received at the first port 336 is directed to a third port 368 of the third three-way valve 292. After exiting the third-three way valve 292 by way of the third port 368, the second heat exchange fluid is direct to the first heat-producing component 288. After interacting with the first heat-producing component 288, the second heat exchange fluid has increased in temperature, pressure, and/or vapor percentage. Upon exiting the first heat-producing component 288, the second heat exchange fluid is directed to a third port 372 of the fourth three-way valve 296. The positioning of the fourth three-way valve 296 in these modes of operation is such that the second heat exchange fluid received at the third port 372 is directed to exit the fourth three-way valve 296 by way of the second port 348 thereof.

With specific reference to FIG. 15, from the second port 348 of the fourth three-way valve 296, the second heat exchange fluid is directed to the first port 352 of the fifth three-way valve 304. The positioning of the fifth three-way valve 304 in the depicted mode of operation is such that the second heat exchange fluid received at the first port 352 is directed to the second port 356 of the fifth three-way valve 304. Upon exiting the second port 356 of the fifth three-way valve 304, the second heat exchange fluid is directed to the inlet 252 of the fifth heat exchanger 156. In the depicted embodiment, the fifth heat exchanger 156 and the second heat-producing component 300 are plumbed in parallel. Accordingly, the second heat-producing component 300 is bypassed in the depicted mode of operation. The fifth heat exchanger 156 performs as already described. Upon exiting the fifth heat exchanger 156 by way of the outlet 256, the second heat exchange fluid is directed to the first port 360 of the sixth three-way valve 308. The positioning of the sixth three-way valve 308 in this mode of operation is such that the second heat exchange fluid received at the first port 360 is directed to exit the sixth three-way valve 308 by way of the second port 364. Upon exiting the sixth three-way valve 308 by way of the second port 364, the second heat exchange fluid is directed to the pump 144, thereby completing traversal of the coolant loop 140.

Referring now to FIG. 16, from the second port 348 of the fourth three-way valve 296, the second heat exchange fluid is directed to the first port 352 of the fifth three-way valve 304. The positioning of the fifth three-way valve 304 in the depicted mode of operation is such that the second heat exchange fluid received at the first port 352 is directed to exit the fifth three-way valve 304 at both the second port 356 and a third port 376. Accordingly, a first portion of the second heat exchange fluid is directed out of the second port 356 and toward the fifth heat exchanger 156, while a second portion of the second heat exchange fluid is directed out of the third port 376 and toward the second heat-producing component 300. As the flow of the first portion of the second heat exchange fluid from the second port 356 to the fifth heat exchanger 156 has been described above, the same is not repeated here for the sake of brevity. In the depicted embodiment, the fifth heat exchanger 156 and the second heat-producing component 300 are plumbed in parallel with both the fifth heat exchanger 156 and the second heat-producing component 300 receiving the second heat exchange fluid. The second portion of the second heat exchange fluid that exits the fifth three-way valve 304 by way of the third port 376 is directed to the second inlet 328 of the second heat-producing component 300. The second heat exchange fluid received at the second inlet 328 exits the second heat-producing component 300 by way of the second outlet 332 thereof. The second heat exchange fluid increases in temperature, pressure, and/or vapor percentage as a result of interaction with the second heat-producing component 300. Upon exiting the second outlet 332 of the second heat-producing component 300, the second heat exchange fluid is directed to a third port 380 of the sixth three-way valve 308. At the sixth three-way valve 308, the first and second portions of the second heat exchange fluid are recombined and directed toward the pump 144, thereby completing traversal of the coolant loop 140.

Figure 18:
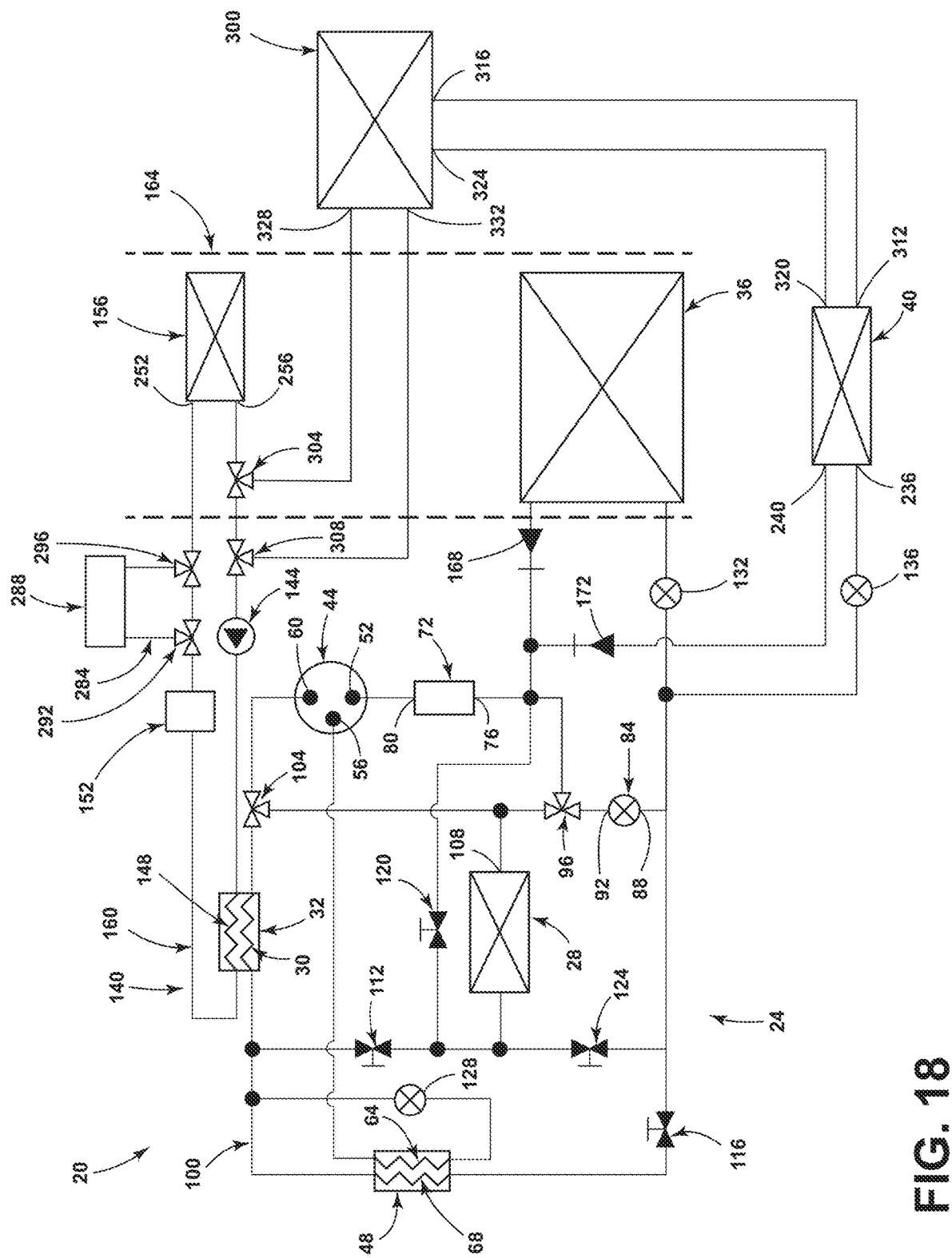
FIG. 18 is a schematic representation of the heat pump arrangement, illustrating the refrigerant loop and the coolant loop, according to another example.

Referring to FIGS. 18-19, in the depicted examples, the second heat-producing component 300 is plumbed in series with the fifth heat exchanger 156. More specifically, the fifth and sixth three-way valves 304, 308 are each downstream of the outlet 256 of the fifth heat exchanger 156 and upstream of the pump 144. However, it is contemplated that the fifth and sixth three-way valves 304, 308 may each be positioned upstream of the inlet 252 of the fifth heat exchanger 156 and downstream of the fourth three-way valve 296 while maintaining the in series arrangement of the fifth heat exchanger 156 and the second heat-producing component 300.

With specific reference to FIG. 19, a heating mode is depicted in exemplary form that employs the auxiliary coolant loop 284, the fifth heat exchanger 156, and the second heat-producing component 300. In the depicted example, the first and second check valves 168, 172 prevent back flow toward the third and fourth heat exchangers 36, 40 as the first heat exchange fluid is directed toward the accumulator 72. Accordingly, the third and fourth heat exchangers 36, 40 are prevented from becoming storage vessels for the first heat exchange fluid when the third and fourth heat exchangers 36, 40 are not employed in a given mode of operation. As the flow of the first heat exchange fluid through the refrigerant loop 24, as depicted, has otherwise already been described above, the same is not repeated here for the sake of brevity. Similarly, as the flow of the second heat exchange fluid through the coolant loop 140 has been largely described above, the same is not repeated here for the sake of brevity. However, additional discussion with regard to the fifth heat exchanger 156 and the second heat-producing component 300 is here provided. Upon exiting the second port 348 of the fourth three-way valve 296, the second heat exchange fluid is directed to the inlet 252 of the fifth heat exchanger 156. The operation of the fifth heat exchanger 156 has been described above and is omitted here for the sake of brevity. The second heat exchange fluid exits the fifth heat exchanger 156 by way of the outlet 256 thereof. From the outlet 256 of the fifth heat exchanger 156, the second heat exchange fluid is directed to the first port 352 of the fifth three-way valve 304. The positioning of the fifth three-way valve 304 in this mode of operation is such that the second heat exchange fluid received at the first port 352 is directed to the third port 376 of the fifth heat exchanger 156.

After exiting the fifth three-way valve 304 by way of the third port 376, the second heat exchange fluid is directed to the second inlet 328 of the second heat-producing component 300 by the coolant network of conduits 160. The second heat-producing component 300 interacts with the second heat exchange fluid in the manner already described. The second heat exchange fluid exits the second heat-producing component 300 by way of the second outlet 332. From the second outlet 332, the second heat exchange fluid is directed to the third port 380 of the sixth three-way valve 308. The positioning of the sixth three-way valve 308 in this mode of operation is such that the second heat exchange fluid received at the third port 380 is directed to the second port 364 thereof. After exiting the sixth three-way valve 308 by way of the second port 364, the second heat exchange fluid is directed to the pump 144, thereby completing traversal of the coolant loop 140.

The present disclosure has discussed a variety of modes of operation and various examples for the heat pump 20. While specific examples of the heat pump 20 and specific examples of the modes of operation of such heat pumps 20 have been discussed in detail, the present disclosure is not limited to the arrangements of the heat pump 20 discussed herein. Similarly, the present disclosure is not limited to the modes of operation discussed herein. Rather, the present disclosure provides exemplary discussion of the operation of the various components of the heat pumps 20 that may inform additional modes of operation and/or arrangements that are not explicitly articulated herein. For example, while the vapor generators 48 employed in FIGS. 2A and 2B differ, the modes of operation may be the same or substantially the same between the example depicted in FIG. 2A and the example depicted in FIG. 2B for each of the modes of operation discussed herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A heat pump, comprising:
a refrigerant loop comprising:
a first heat exchanger;
a first region of a second heat exchanger;
a third heat exchanger;
a fourth heat exchanger;
a compressor having a low-pressure inlet, a mid-pressure inlet, and an outlet;
a vapor generator positioned downstream of the outlet of the compressor and upstream of both the low-pressure inlet and the mid-pressure inlet, wherein the vapor generator comprises a first region and a second region configured to thermally interact with one another, wherein the first region connects a first inlet of the vapor generator to a first outlet of the vapor generator, and the second region connects a second inlet of the vapor generator to a second output of the vapor generator;
an accumulator positioned immediately upstream of the compressor, wherein the accumulator comprises an inlet and an outlet;
a first expansion valve positioned upstream of the accumulator, wherein the first expansion valve comprises an inlet and an outlet; and
a first three-way valve positioned immediately downstream of the first expansion valve and immediately upstream of the accumulator, wherein the first three-way valve directs a first heat exchange fluid from the outlet of the first expansion valve to the inlet of the accumulator during at least one mode of operation.

2. The heat pump of claim 1, wherein the vapor generator is a plate-style heat exchanger.

3. The heat pump of claim 1, wherein the at least one mode of operation is a deicing mode of operation.

4. The heat pump of claim 1, wherein the refrigerant loop further comprises:
a first check valve positioned immediately downstream of the third heat exchanger; and
a second check valve positioned immediately downstream of the fourth heat exchanger.

5. The heat pump of claim 1, wherein the refrigerant loop further comprises:
a second three-way valve positioned downstream of the outlet of the compressor and upstream of an inlet of the first heat exchanger, wherein the second three-way valve is positioned upstream of the first region of the second heat exchanger.

6. The heat pump of claim 1, wherein the refrigerant loop further comprises:
a second expansion valve positioned upstream of the first region of the vapor generator.

7. The heat pump of claim 6, wherein the refrigerant loop further comprises:
a third expansion valve positioned upstream of the third heat exchanger.

8. The heat pump of claim 7, wherein the refrigerant loop further comprises:
a fourth expansion valve positioned upstream of the fourth heat exchanger.

9. The heat pump of claim 1, wherein the refrigerant loop further comprises:
a first shutoff valve plumbed in series with the first heat exchanger, wherein the first shutoff valve is positioned downstream of the first heat exchanger.

10. The heat pump of claim 9, wherein the refrigerant loop further comprises:
a second shutoff valve plumbed in series with the second region of the vapor generator, wherein the second shutoff valve is positioned downstream of the second region of the vapor generator.

11. The heat pump of claim 10, wherein the refrigerant loop further comprises:
a third shutoff valve plumbed in series with the first heat exchanger, wherein the third shutoff valve is downstream of the first heat exchanger, and wherein the third shutoff valve is upstream of the accumulator.

12. The heat pump of claim 11, wherein the refrigerant loop further comprises:
a fourth shutoff valve plumbed in series with the first heat exchanger, wherein the fourth shutoff valve is downstream of the first heat exchanger, and wherein the fourth shutoff valve is in an open position during the at least one mode of operation.

13. The heat pump of claim 1, further comprising: a coolant loop comprising: a second region of the second heat exchanger; a pump; a fifth heat exchanger; a reservoir; and a coolant network of conduits that fluidly couples components of the coolant loop.

* * * * *